United States Patent
Kuno

(10) Patent No.: US 8,523,280 B2
(45) Date of Patent: Sep. 3, 2013

(54) VEHICLE SEAT

(75) Inventor: Satoru Kuno, Aichi-Ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 315 days.

(21) Appl. No.: 12/753,321

(22) Filed: Apr. 2, 2010

(65) Prior Publication Data

US 2010/0259081 A1  Oct. 14, 2010

(30) Foreign Application Priority Data

Apr. 10, 2009 (JP) ................................. 2009-096128

(51) Int. Cl.
*B60N 2/10* (2006.01)

(52) U.S. Cl.
USPC ............................. 297/322; 297/329; 297/343

(58) Field of Classification Search
USPC ........................... 297/320–322, 329, 342, 343
See application file for complete search history.

(56) References Cited

U.S. PATENT DOCUMENTS

| | | | | |
|---|---|---|---|---|
| 4,842,333 | A * | 6/1989 | Meiller | 297/329 |
| 5,133,587 | A * | 7/1992 | Hadden, Jr. | 297/146 |
| 6,030,043 | A | 2/2000 | Habedank | |
| 6,237,994 | B1 * | 5/2001 | Bentley et al. | 297/118 |
| 6,334,648 | B1 * | 1/2002 | Girsberger et al. | 297/216.19 |
| 6,340,208 | B1 * | 1/2002 | Habedank | 297/322 |
| 6,641,214 | B2 * | 11/2003 | Veneruso | 297/322 |
| 6,742,840 | B2 * | 6/2004 | Bentley | 297/316 |
| 8,052,214 | B2 * | 11/2011 | Okimoto et al. | 297/330 |
| 2009/0134682 | A1 | 5/2009 | Andou et al. | |
| 2009/0243359 | A1 | 10/2009 | Yoshida et al. | |
| 2009/0302632 | A1 | 12/2009 | Kuno et al. | |
| 2010/0109404 | A1 | 5/2010 | Yamagishi et al. | |

FOREIGN PATENT DOCUMENTS

| | | |
|---|---|---|
| DE | 19727306 | 2/1999 |
| DE | 19756272 | 7/1999 |
| DE | 19828217 | 7/1999 |
| DE | 19811959 | 9/1999 |
| DE | 10045066 | 1/2002 |
| JP | 7-327768 | 12/1995 |
| JP | 07-327768 | 12/1995 |
| JP | 2003-199641 | 7/2003 |

(Continued)

OTHER PUBLICATIONS

Germany Office action, dated Dec. 28, 2010 along with an english translation thereof.

*Primary Examiner* — David Dunn
*Assistant Examiner* — Tania Abraham
(74) *Attorney, Agent, or Firm* — Greenblum & Bernstein, P.L.C.

(57) ABSTRACT

In a vehicle seat having a seat back and a seat cushion that are placed in one of a normal position and a reclining position that is more reclined than the normal position, a link mechanism is operable to change the positions of the seat back and the seat cushion by moving the seat back and the seat cushion in relation to each other, so that a back contact point of the seat back, where a predetermined portion of the back of the seated person contacts the seat back, contacts the predetermined portion of the back of the seated person in both the normal position and the reclining position, and so that an ischial contact point of the seat cushion, where a tuber-of-ischium of the seated person contacts the seat cushion, contacts the tuber-of-ischium of the seated person in both the normal position and the reclining position.

12 Claims, 11 Drawing Sheets

(56) References Cited

FOREIGN PATENT DOCUMENTS

| JP | 2005-198979 | 7/2005 |
| JP | 2005-289133 | 10/2005 |
| JP | 2006-123715 | 5/2006 |
| JP | 2008-173278 | 7/2008 |

* cited by examiner

1

VEHICLE SEAT

INCORPORATION BY REFERENCE

The disclosure of Japanese Patent Application No. 2009-96128 filed on Apr. 10, 2009 including the specification, drawings and abstract is incorporated herein by reference in its entirety.

BACKGROUND OF THE INVENTION

1. Field of the Invention

The invention relates to a vehicle seat.

2. Description of the Related Art

FIG. 8 is a schematic view useful for explaining the reclining motion of a known vehicle seat 510. In FIG. 8, constituent elements of the vehicle seat 510 are illustrated in simplified forms, and the construction of the seat 510 is partially omitted. As shown in FIG. 8, the vehicle seat 510 is provided as a rear seat in the second row or third row in the vehicle compartment, and consists principally of a seat back 530 and a seat cushion 520. The seat back 530 of the vehicle seat 510 is mounted along a vehicle-body wall 580 formed as a part of a vehicle-body structure, such as a luggage compartment, and the seat cushion 520 is supported on the vehicle body to be slidable in the longitudinal direction of the vehicle. Also, the seat back 530 and the seat cushion 520 are coupled to each other such that they can pivot relative to each other. In FIG. 8, the seat back 530 and seat cushion 520 indicated by two-dot chain lines are those of the vehicle seat 510 that is in a normal position 510A, and the seat back 530 and seat cushion 520 indicated by solid lines are those of the vehicle seat 510 that is in a reclining position 510B.

As shown in FIG. 8, the vehicle-body structure, such as a luggage compartment, is formed behind the vehicle seat 510, and thus almost no space is provided behind the seat back 530. Therefore, the seat back 530 cannot be inclined rearwards while the seat cushion 520 is in a non-moving or stationary condition, as is the case with conventional vehicle seats. Thus, where the reclining motion of the seat back 530 is limited by the layout of the vehicle compartment, the vehicle seat 510 needs to be operated in the following manner. Initially, the seat cushion 520 that is in the normal position 510A is caused to slide toward the front of the vehicle. As a result, the seat back 530 coupled to the seat cushion 520 moves downward along the wall of the vehicle-body structure, such as a luggage compartment, which is located behind the seat back 530, and the angle between the seat cushion 520 and the seat back 530 is increased so that the vehicle seat 510 is placed in the reclining position 510B.

FIG. 9 is a schematic view useful for explaining the movement of the above-described vehicle seat 510 between the normal position 510A and the reclining position 510B with reference to a hip point HP about which the torso and thigh of a seated person M pivot and which corresponds to the hip joint of the seated person M. As shown in FIG. 9, a back contact point P of the seat back when the vehicle seat 510 is in the normal position 510A and a back contact point Q on the back of the seated person M which contacts the point P are shifted to P1, Q1, respectively, when the vehicle seat 510 is placed in the reclining position 510B. This is because, when the seat 510 is moved from the normal position 510A to the reclining position 510B, P moves about a pivot point of the seat back 530 and reaches P1 whereas Q moves about the hip point HP and reaches Q1. Similarly, an ischial contact point R of the seated person M when the vehicle seat 510 is in the normal position 510A is shifted to R1 when the vehicle seat 510 is placed in the reclining position 510B.

Due to the phenomena as described above, the positional relationship between the back contact point P at which the back of the seated person M contacts the seat back 530 and the ischial contact point R at which the tuber of ischium of the seated person M contacts the seat cushion 520 largely varies between the normal position 510A and the reclining position 510B. Therefore, the seated person M may feel uncomfortable because of a "back displacement X" that causes a shirt, or the like, which the seated person M is wearing to be pulled up during reclining, and/or a "hip displacement Y" that causes the trousers or skirt of the person M to rise up along his/her body during reclining.

The problems arising from the "back displacement X" and "hip displacement Y" are not limited to the discomfort of the seated person M caused by pull-up of the shirt, or the like, or rising of the trousers or skirt during reclining of the vehicle seat. Namely, if the relationship in position between the back contact point P of the seat back 530 and the ischial contact point R of the seat cushion 520 is largely different between the normal position 510A and the reclining position 510B, the seated person M will be seated on the vehicle seat having a different shape from that determined in the normal position 510A, in which a lumbar support, seat heater, ventilator, sensor(s) and other equipment are mounted at different locations, when the vehicle seat 510 is placed in the reclining position 510B. Also, if the headrest is adjusted to an appropriate position in the reclining position 510B, for example, the headrest will be lowered with respect to the seated person M when the seat 510 is placed in the normal position 510A, thus requiring an adjustment to be made again.

As described above, when the vehicle seat 510 is placed in the reclining position 510B, the seat cushion 520 is caused to slide in the forward direction of the vehicle so that the seat back 530 can be inclined. Therefore, in the arrangement where an ottoman device 522 for supporting the crura of the seated person M is mounted to a front end portion of the seat cushion 520, space in front of the toes of the person M is undesirably reduced when the vehicle seat 510 is placed in the reclining position 510B and the seated person M takes a relaxed posture with his/her feet extending forward. Furthermore, when the vehicle seat 510 is placed in the reclining position 510B, the amount of overlap of the seat back 530 with the seated person M increases to Z2 as indicated in FIG. 9, though the amount of overlap is Z1 (<Z2) when the vehicle seat 510 is in the normal position 510A. However, the seated person M does not sink into the seat back 530 by the theoretical amount of overlap Z2, when the vehicle seat 510 reclines. As a result, the seated person M is bounced forward due to the force applied from a cushion pad of the seat back 530, and is pushed further forward in the longitudinal direction of the vehicle, resulting in a further reduction of the space in front of the toes.

One example of vehicle seat that is less likely to suffer from the "back displacement" as described above is described in Japanese Patent Application Publication No. 7-327768 (JP-A-7-327768). The vehicle seat described in JP-A-7-327768 is arranged to reduce a displacement of the back contact point on the seat back of the seat in the reclining position from that of the seat in the normal position, by sliding the seat cushion forward and moving the seat cushion up and down by a link mechanism.

However, if the movement of the back contact point on the seat back between the normal position and the reclining position is observed with reference to the hip point, the seat of JP-A-7-327768 is arranged only to reduce the back displacement, but still cannot eliminate the back displacement. Also, the above-mentioned problems of "hip displacement on the seat cushion" and "reduction of the space in front of the toes of the seated person in the reclining position" are still not solved with the seat of JP-A-7-327768.

SUMMARY OF THE INVENTION

As shown in FIG. 10, no "back displacement X" nor "hip displacement Y" takes place when the seat back 530 and the seat cushion 520 are in the positions indicated by broken lines. The movements of the seat back 530 and the seat cushion 520 to the positions as shown in FIG. 10 when the vehicle seat 510 reclines will be explained in a different way. If the seat back 530 can be moved to the reclining position 510B with the back of the seated person being kept in contact with the seat back 530 without moving relative to the seat back 530, and the seat cushion 520 can be moved to the reclining position 520B with the hip of the seated person being kept in contact with the seat cushion 520 without moving relative to the seat cushion 520, no "back displacement X" nor "hip displacement Y" will take place. The inventor of the present invention studied a mechanism with which the positions of the seat back 530 and the seat cushion 520 are changed without causing any "back displacement X" and "hip displacement Y", with reference to the following two locations of the body of the seated person.

Initially, the above-mentioned mechanism was studied with reference to the hip point as a first location of the body of the seated person. The mechanism with which the positions of the seat back 530 and the seat cushion 520 are changed without causing any "back displacement X" and "hip displacement Y" may be referred to as a mechanism that keeps certain portions of the body of the seated person in contact with the seat back and the seat cushion without moving these portions of the body relative to the seat back and the seat cushion. In other words, if the positions of the seat back 530 and the seat cushion 520 can be changed around the hip point of the seated person, no "back displacement X" nor "hip displacement Y" will appear.

Next, the above-mentioned mechanism was studied with reference to the tuber of ischium as a second location of the body of the seated person. If the seat cushion is not moved but held in a fixed position, the tuber of ischium of the seated person does not move at all, and no "hip displacement Y" appears. In this condition, if the position of the seat back can be changed around the tuber-of-ischium point, without causing any change in the positional relationship between the seat back and the tuber-of-ischium point as seen in a side view of the seat cushion, no "back displacement X" will appear. Namely, if the positions of the seat cushion and the seat back can be changed from the normal position to the reclining position such that the seat cushion and the seat back pivot about the tuber-of-ischium point as seen in the side view of the seat cushion, the changes in the positions will not cause any "back displacement X" and "hip displacement Y".

Thus, where the mechanism with which the positions of the seat back 530 and the seat cushion 520 are changed without causing any "back displacement X" and "hip displacement Y" is observed from various points of view, the relationship of the positions of the seat back 530 and the seat cushion 520 relative to the hip point is deemed important, and the relationship of the positions of the seat back 530 and the seat cushion 520 relative to the tuber-of-ischium point is also deemed important. Thus, there are two points to be noted when studying the mechanism as described above.

The invention is concerned with a vehicle seat that consists principally of a seat back and a seat cushion each of which is movable between a first position and a second position relative to a mounting portion, such as a vehicle body, on which the seat back or seat cushion is mounted, wherein the seat back that is in the second position is more reclined than the seat back that is in the first position. The present invention provides the vehicle seat as described above, which is substantially free from "back displacement" and "hip displacement" of the seated person.

A first aspect of the invention provides a vehicle seat that includes: a seat back that is placed in one of a first position and a second position relative to a mounting portion of the vehicle body on which the seat back is mounted, a seat cushion that is placed in one of a first position and a second position relative to a mounting portion of the vehicle body on which the seat cushion is mounted, and a linked position-changing unit that moves the seat back and the seat cushion in relation to each other, so as to change the positions of the seat back and the seat cushion between the first positions and the second positions. In the vehicle seat, the seat back that is in the second position is more reclined than the seat back that is in the first position, and the linked position-changing unit moves the seat back and the seat cushion in relation to each other, so that a back contact point of the seat back, at which a predetermined portion of the back of the seated person contacts the seat back when the seat back and the seat cushion are in the first positions, is located at substantially the same position as the predetermined portion of the back of the seated person when the seat back and the seat cushion are in the second positions and so that an ischial contact point of the seat cushion, at which the tuber of ischium of the seated person contacts the seat cushion when the seat back and the seat cushion are in the first positions, is located at substantially the same position as the tuber of ischium of the seated person when the seat back and the seat cushion are in the second positions.

According to the first aspect of the invention, the back contact point of the seat back, at which the predetermined portion of the back of the seated person contacts the seat back, contacts the predetermined portion of the back of the seated person when the seat back and the seat cushion are in both the first positions and the second positions, and the ischial contact point of the seat cushion contacts the tuber-of-ischium of the seated person when the seat back and the seat cushion are in both the first positions and the second positions. Therefore, the "back displacement" and "hip displacement" of the seated person can be eliminated. Namely, the seated person does not feel uncomfortable since the positions at which the seated person contacts the seat and which are determined when the person is seated in the seat that is in a normal position as the first positions do not change even when the seat is moved to a reclining position as the second positions. Also, the inconvenience of, for example, re-sitting in the seat due to the "back displacement" or "hip displacement" is eliminated. Where the vehicle seat is equipped with, for example, a lumbar support, seat heater, ventilator, sensor(s), and the like, the positions of these devices relative to the seated person are expected not to change even when the seat is brought into the reclining position.

In the vehicle seat according to the first aspect of the invention, the linked position-changing unit may include a mechanical link mechanism that couples the seat back and the seat cushion to each other, and is arranged to move the seat back and the seat cushion in relation to each other so as to change the respective positions thereof. When the position of the seat back is changed between the first position and the second position while the seated person is seated in the vehicle seat, the position of the seat cushion may be changed in connection with the change in the position of the seat back, such that substantially no change arises in a positional relationship of the tuber of ischium of the seated person relative to the seat cushion as seen in a side view of the seat cushion.

In the vehicle seat as described above, the linked position-changing unit includes the mechanical link mechanism that couples the seat back and the seat cushion to each other, and the positions of the seat back and the seat cushion are changed in relation to each other without requiring a complicated arrangement, thus assuring reduced cost. Also, while the seated person is seated in the vehicle seat, the position of the seat cushion is changed between the first position and the second position in connection with the change in the position of the seat back, without causing a change in the positional relationship of the tuber of ischium of the seated person relative to the seat cushion as seen in the side view of the seat cushion. Therefore, the "back displacement" and "hip displacement" of the seated person can be eliminated. Also, the positions of the seat back and the seat cushion are changed from the normal position to the reclining position such that the seat cushion and the seat back pivot about the tuber-of-ischium point as seen in the side view of the seat cushion.

The positions of the seat back and the seat cushion are changed with reference to the hip point, in the following manner. In the vehicle seat according to the first aspect of the invention, the seat back and the seat cushion are coupled to each other by the mechanical link mechanism, and the linked position-changing unit is arranged to change the positions of the seat back and the seat cushion in relation to each other. The position of the seat back relative to the hip point corresponding to the hip joint of the seated person about which the torso and thigh of the seated person can pivot is shifted downward and is inclined rearward of the vehicle when the seat back and seat cushion are placed in the second positions, as compared with the position of the seat back relative to the hip point when the seat back and seat cushion are in the first positions. The position of the seat cushion relative to the hip point is shifted forward in the longitudinal direction of the vehicle when the seat back and seat cushion are placed in the second positions, as compared with the position of the seat cushion relative to the hip point when the seat back and seat cushion are in the first positions.

In this case, the seat back and the seat cushion are coupled to each other by the mechanical link mechanism, and the linked position-changing unit is arranged to change the positions of the seat back and the seat cushion in relation to each other, thus making it possible to eliminate the "back displacement" and "hip displacement" without requiring a complicated arrangement. Also, the position of the seat back relative to the hip point is changed downward and the seat back is inclined rearward of the vehicle when the seat back and seat cushion are placed in the second positions, as compared with the relative position of the seat back when the seat back and seat cushion are in the first positions. In addition, the position of the seat cushion relative to the hip point is changed forward or toward the front of the vehicle. Due to the changes in the positions of the seat back and the seat cushion, the hip point of the seated person does not only move forward in the longitudinal direction of the vehicle as in the conventional seat, but also moves upward in the vertical direction of the vehicle. Thus, the hip point of the seated person moves both in the longitudinal direction and vertical direction of the vehicle, and the amount of movement of the hip point in the longitudinal direction of the vehicle can be substantially reduced. Consequently, the amount of reduction in the space in front of the toes of the seated person when the seat back and seat cushion are placed in the second positions can be reduced. With the amount of reduction in the space in front of the toes of the seated person thus reduced, a sufficiently large space is provided in front of the toes of the seated person; therefore, enough room is substantially provided in the vehicle compartment, and the wheelbase of the vehicle can be reduced accordingly. Thus, advantageous effects in terms of the vehicle weight and cost can be expected.

In the vehicle seat according to the first aspect of the invention, the positional relationship of the tuber of ischium of the seated person relative to the seat cushion when the seat back and the seat cushion are in the first positions and the positional relationship of the tuber of ischium of the seated person relative to the seat cushion when the seat back and the seat cushion are in the second positions may be determined by correcting the position of the tuber of ischium of the seated person in view of the amounts of deformation of the seat cushion and the seat back due to a load applied from the seated person.

In the vehicle seat as described above, the positional relationship of the tuber of ischium of the seated person relative to the seat cushion when the seat back and the seat cushion are in the normal positions and in second positions is determined by correcting the position of the tuber of ischium of the seated person in view of the amounts of deformation of the seat cushion and the seat back due to the load applied from the seated person. When the positions of the seat cushion and the seat back are changed from those of the first positions to those of the second position, the posture of the seated person relative to the seat cushion and the seat back changes, causing variations in the magnitudes of the loads applied from the seated person to the seat cushion and seat back and the directions in which the loads are applied. Due to the variations in the amounts of deformation of the seat cushion and the seat back, the ischial contact point is displaced or shifted by an amount corresponding to the amounts of deformation. Therefore, the position of the tuber of ischium of the seated person relative to the seat cushion is corrected in view of the amounts of deformation of the seat cushion and the seat back, so that the "back displacement" and "hip displacement" of the seated person can be eliminated with further reliability.

In the vehicle seat according to the first aspect of the invention, when the positions of the seat back and the seat cushion are changed from the first positions to the second positions, an upward change in the position of the seat cushion relative to the mounting portion of the vehicle body and a downward change in the position of the seat back relative to the mounting portion of the vehicle body may be effected at the same time in relation to each other.

In the vehicle seat as described above, when the position of the vehicle seat (the seat cushion and the seat back) is changed from the first position to the second position, the upward change in the position of the seat cushion relative to the mounting portion of the vehicle body and a downward change in the position of the seat back relative to the mounting portion of the vehicle body are effected at the same time in relation to each other. Therefore, no "displacements" appear between the back contact point and ischial contact point when the vehicle seat is in the first position and the back contact point and ischial contact point when the vehicle seat is in the second position.

In addition, the change in the position of the seat cushion and the change in the position of the seat back take place at the same time in relation to each other; therefore, the positions of the seat back and the seat cushion can be changed without causing no "back displacement" nor "hip displacement" even during changes in the positions of the seat cushion and seat back from the first positions to the second positions. Accordingly, the seated person feels more comfortable when the vehicle seat reclines.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Some embodiments of the invention will be described with reference to the drawings.

Figure 1:
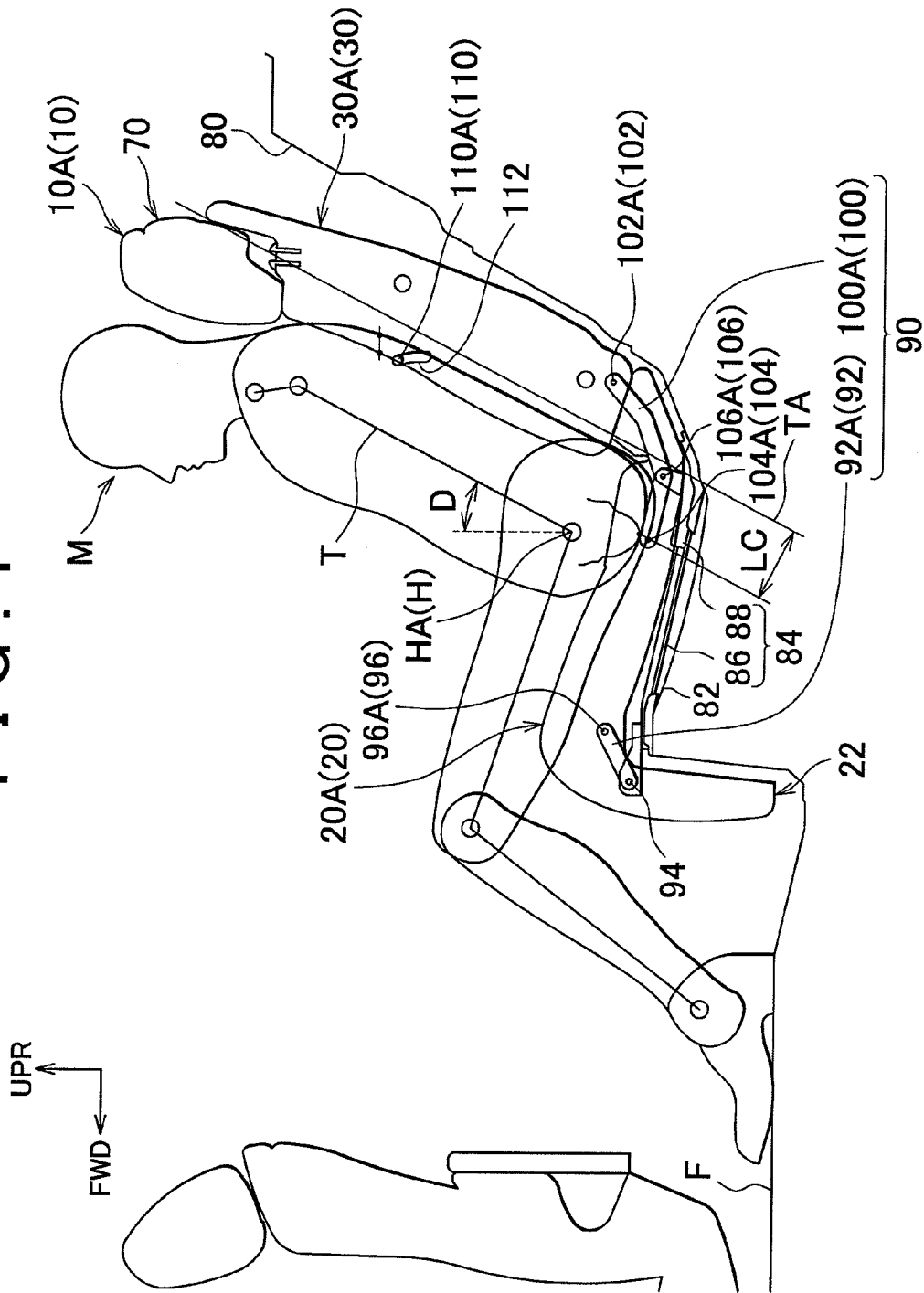
FIG. 1 is a schematic view showing a vehicle seat according to a first embodiment of the invention when the seat is in a normal position.
Figure 2:
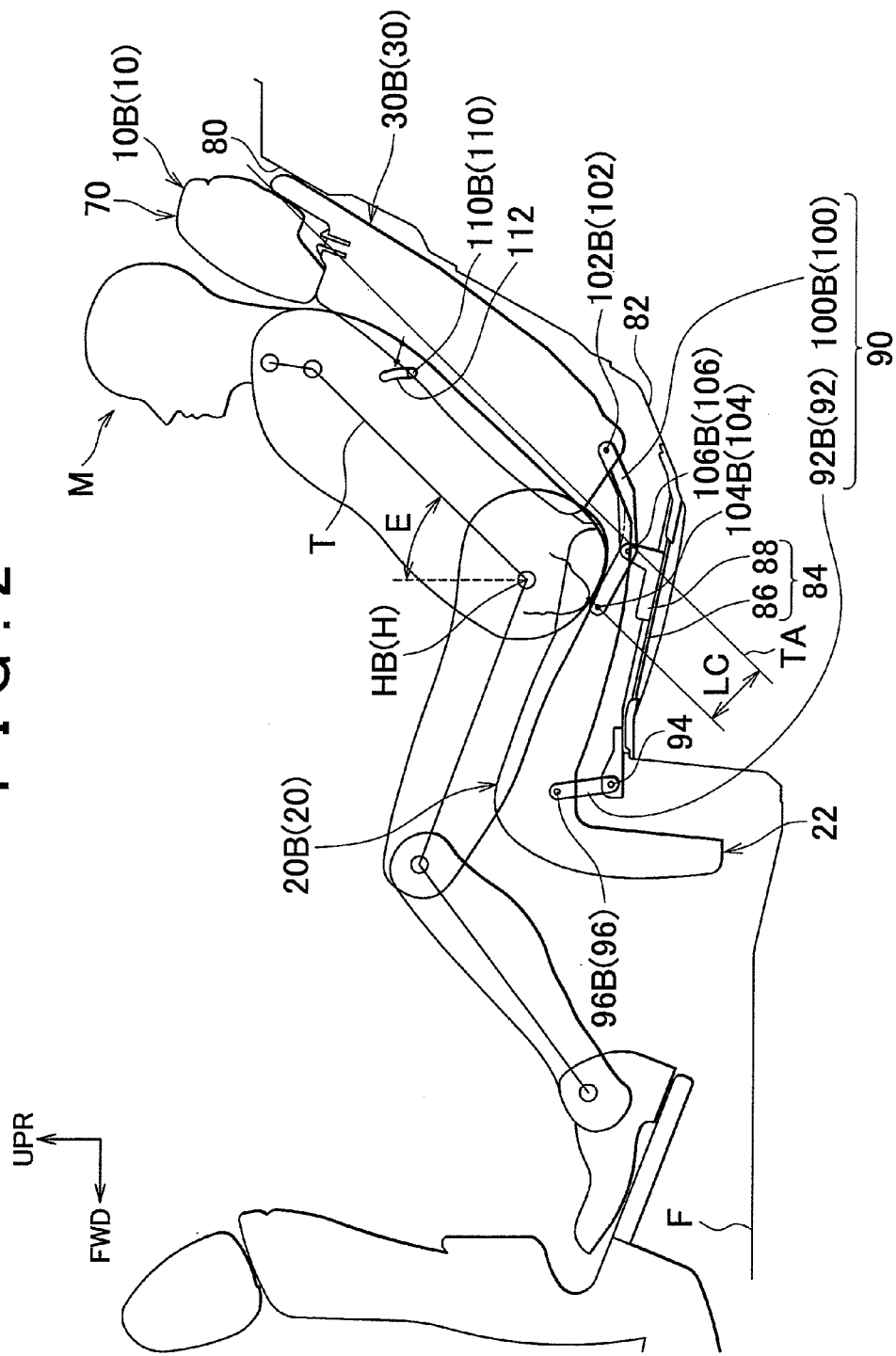
FIG. 2 is a schematic view showing the vehicle seat of the first embodiment when it is in a reclining position.
Figure 3:
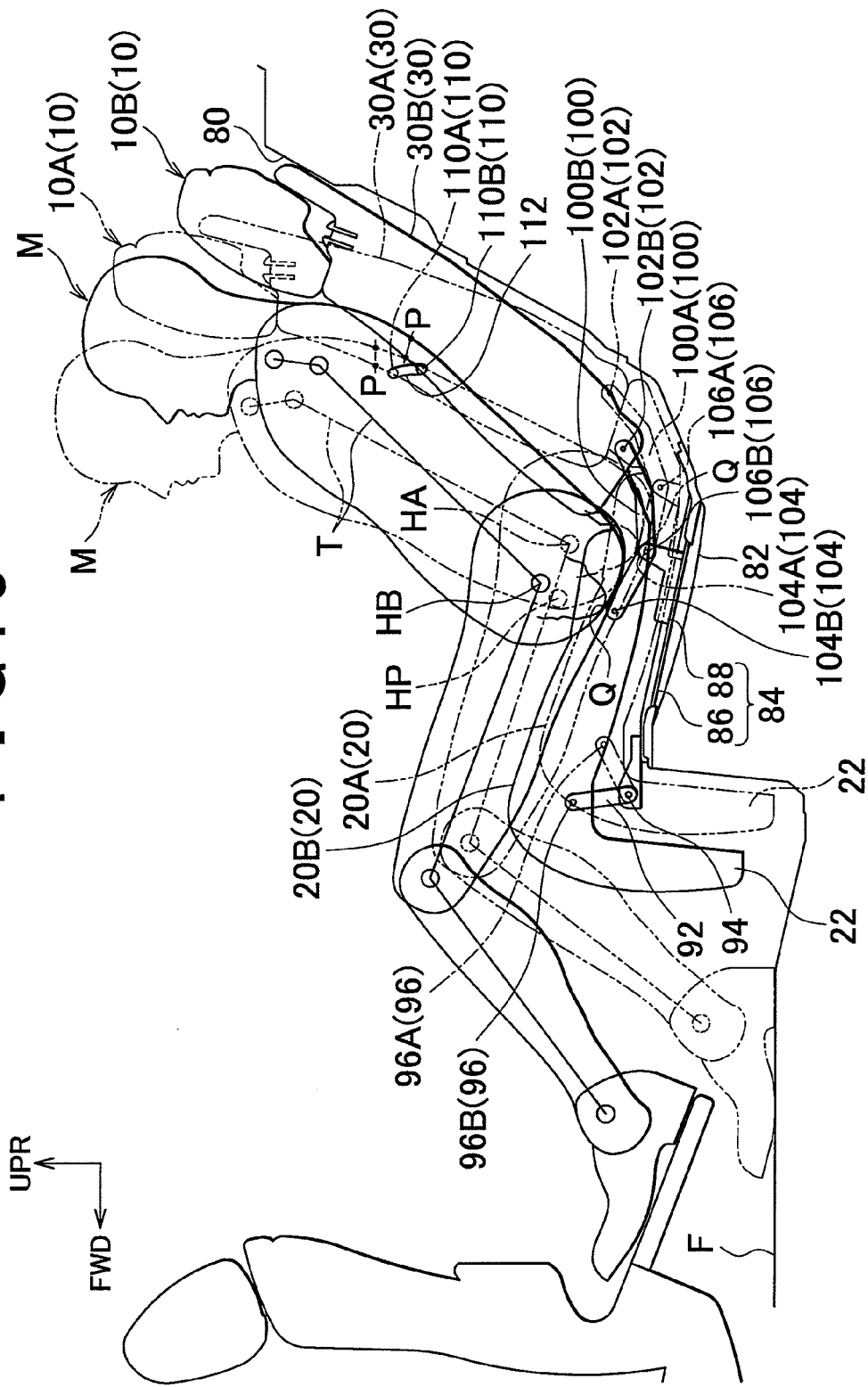
FIG. 3 is a schematic view showing the vehicle seat of the first embodiment that is in the normal position and the vehicle seat of the first embodiment that is in the reclining position, which are superimposed on each other.

Referring first to FIG. 1 through FIG. 3, the construction of a vehicle seat 10 as a first embodiment of the invention as viewed with reference to a hip point will be described. In FIG. 1-FIG. 3, constituent elements of the vehicle seat 10 are illustrated in simplified forms, and the construction of the seat 10 is partially omitted. Thus, in FIG. 1-FIG. 3, the framework and detailed structures of a headrest 70, a seat cushion 20 and a seat back 30 included in the vehicle seat 10 of the first embodiment are not illustrated. In FIG. 1-FIG. 3, two arrows labeled "FWD" and "UPR" denote the forward and upward directions, respectively, of the vehicle seat 10. In the following description of the first embodiment, an overview of the vehicle seat 10 will be initially provided, and then detailed description of its structure will be provided. The vehicle seat 10 of the first embodiment is characterized in the positions of the seat back 30 and the seat cushion 20 relative to the hip point H when the seat 10 is in a normal position 10A and when the seat 10 is in a reclining position 10B. The seat 10 in the reclining position 10B is more reclined than the seat 10 in the normal position 10A. The other portions of the vehicle seat 10 are not required to be particularly changed, and the description of the other portions may be omitted.

FIG. 1 is a schematic view showing the vehicle seat 10 of the first embodiment when it is placed in the normal position 10A. FIG. 2 is a schematic view showing the vehicle seat 10 of the first embodiment when it is placed in the reclining position 10B. The vehicle seat 10 of the first embodiment is employed as a rear seat in the second or third row of the vehicle, for example. More specifically, the vehicle seat 10 of the first embodiment is a rear seat mounted in the second row of a so-called sedan type vehicle, and a vehicle-body wall 80 as a part of a vehicle-body structure for defining a luggage compartment is formed at the back side of the seat 10. As shown in FIG. 1 and FIG. 2, the vehicle seat 10 as a rear seat of the vehicle consists principally of a seat back 30 on which the back of a seated person M rests, a seat cushion 20 on which the seated person M is seated, and a headrest 70 on which the head of the seated person M rests. The vehicle seat 10 may be selectively placed in the normal position 10A (see FIG. 1) and the reclining position 10B (see FIG. 2) in which the seat back 30 and the seat cushion 20 are placed in different positions or states relative to portions of the vehicle body on which the seat back 30 and the seat cushion 20 are mounted.

As shown in FIG. 1, the normal position 10A may be regarded as the above-mentioned "first position" of the invention. When the vehicle seat 10 is in the normal position 10A, the angle D between the seated person M (or the seat back 30) and the vertical is 28 degrees. In the normal position 10A as shown in FIG. 1, the seat back 30 is in a seat-back normal position 30A, and the seat cushion 20 is in a seat-cushion normal position 20A. Also, the hip point of the seated person M seated in the vehicle seat 10 in the normal position 10A is denoted as "hip point HA" in FIG. 1. As shown in FIG. 2, the reclining position 10B may be regarded as the above-mentioned "second position" of the invention. When the vehicle seat 10 is in the reclining position 10B, the angle E between the seated person M (or the seat back 30) and the vertical is 45 degrees. In the reclining position 10B as shown in FIG. 2, the seat back 30 is in a seat-back reclining position 30B, and the seat cushion 20 is in a seat-cushion reclining position 20B. Also, the hip point of the seated person M seated in the vehicle seat 10 in the reclining position 10B is denoted as "hip point HB" in FIG. 2. FIG. 3 is a schematic view showing the vehicle seat of the first embodiment placed in the normal position and the vehicle seat placed in the reclining position, which are superimposed on each other. In FIG. 3, two-dot chain lines indicate the vehicle seat 10 that is in the normal position 10A, and solid lines indicate the vehicle seat 10 that is in the reclining position 10B.

As shown in FIG. 1 and FIG. 2, the seat back 30 and the seat cushion 20 are placed in a selected one of the normal position 10A and the reclining position 10B by means of a linked position-changing unit that changes the positions of the seat back 30 and the seat cushion 20 in relation to each other. The linked position-changing unit changes the positions of the seat back 30 and the seat cushion 20 that are coupled to each other by a mechanical coupling mechanism, such that the seat back 30 and the seat cushion 20 move in relation to each other. In the first embodiment, a link mechanism 90 is selected as the mechanical coupling mechanism. The link mechanism 90 is operable to move the seat back 30 and the seat cushion 20 relative to the hip point H about which the torso (Or middle region) and thigh (or femoral region) of the seated person M can pivot and which corresponds to the hip joint of the seated person M.

More specifically, the position of the seat back 30 relative to the hip point H when it is placed in the seat-back reclining position 30B is shifted downward in the vertical direction of the vehicle and is inclined rearward of the vehicle, with respect to the position of the seat back 30 when it is in the seat-back normal position 30A, as shown in FIG. 3. Therefore, a back contact point P at which the back of the seated person M contacts the seat back 30 when the seated person M is seated in the vehicle seat 10 that is in the normal position 10A (the seat back 30 is in the seat-back normal position 30A) is located at substantially the same position as the back contact point P obtained when the seated person M is seated in the seat 10 that is in the reclining position 10B (the seat back 30 is in the seat-back reclining position 30B), due to associated or related movements of the seat back 30 and the seat cushion 20 as will be described later.

As shown in FIG. 3, the position of the seat cushion 20 relative to the hip point H when it is placed in the seat-cushion reclining position 20B is shifted forward (or toward the front of the vehicle), with respect to the position of the seat cushion 20 when it is in the seat-cushion reclining position 20A. Therefore, due to the associated movements of the seat back 30 and the seat cushion 20 as described above, a ischial contact point Q at which the tuber of ischium of the seated person M contacts the seat cushion 20 when the seated person M is seated in the vehicle seat 10 that is in the normal position 10A (the seat cushion 20 is in the seat-cushion normal position 20A) is located at substantially the same position as the point Q obtained when the seated person M is seated in the seat 10 that is in the reclining position 10B (the seat cushion 20 is in the seat-cushion reclining position 20B). As is understood from the trajectory of the hip point P from hip point HA to hip point HB as shown in FIG. 3, the seated person M moves frontward and upward of the vehicle as if he/she were lifted up and forward, due to changes in the positions of the seat back 30 and the seat cushion 20 caused by the operation of the link mechanism 90.

Next, the arrangements associated with the vehicle seat 10 of this embodiment will be described. Initially, the vehicle-body structure on which the vehicle seat 10 is installed will be described. As shown in FIG. 1 and FIG. 2, the vehicle-body wall 80 that is inclined rearward of the vehicle so as to define the luggage compartment is formed at the back side of the vehicle seat 10, such that the wall 80 extends to the vicinity of a shoulder portion of the seat back 30. Also, a floor disposed under the vehicle seat 10 is formed with a step. More specifically, the lowest surface of the floor is provided by a vehicle-compartment floor F on which the feet of the seated person M are placed. A generally vertical wall is formed which rises from the vehicle-compartment floor F as the lowest surface, and a seat-cushion mount floor 82 that is higher by one step than the floor F is formed. The seat-cushion mount floor 82 is gently inclined upward from the rear end to the front end of the seat cushion 20 (i.e., toward the front of the vehicle). Thus, there is substantially no space behind the seat back 30 since the vehicle-body wall 80 as the vehicle-body structure is formed behind the vehicle seat 10. Namely, there is substantially no space behind the vehicle seat 10. Therefore, the reclining motion of the seat back 30 is limited by the layout of the vehicle compartment. Namely, the seat back 30 cannot be inclined backwards while the seat cushion 20 is in a non-moving or stationary condition. Also, the seat cushion 20 cannot be inclined downward in the vertical direction of the vehicle.

The seat cushion 20 will be described in more detail. As shown in FIG. 1 and FIG. 2, the seat cushion 20 provides a surface on which the seated person M is seated. Although not illustrated in the drawings, the seat cushion 20 has a skeleton framework covered with a seat pad formed of a foam, and a skin or cover is placed over the seat pad. Also, a seat heater, ventilator, sensor(s), etc. are mounted as needed within the seat cushion 20. In the first embodiment, the vehicle seat 10 has an ottoman device 22 for supporting the crura of the seated person M, as shown in FIG. 1 and FIG. 2. The ottoman device 22 is provided at a front end portion of the seat cushion 20, and includes a main body and an actuator (not shown) for operating the main body. Although not illustrated in the drawings, the main body of the ottoman device 22 is movable between a hung position in which the ottoman is hung from the front end of the seat cushion 20, and a deployed position in which the ottoman extends substantially in the horizontal direction from the seat cushion 20 toward the front of the vehicle.

The seat cushion 20 is supported on the seat-cushion mount floor 82 such that the seat cushion 20 is slidable in the longitudinal direction of the vehicle. To support the seat cushion 20, a pair of right and left slide rails 84 are mounted in parallel with each other on the seat-cushion mount floor 82. Each of the slide rails 84 consists of a lower rail 86 joined to the seat-cushion mount floor 82, and an upper rail 88 slidably supported on the lower rail 86. The right and left upper rails 88 that correspond to the lower rails 86 and extend in parallel with each other are joined to the skeleton framework of the seat cushion 20. Thus, the upper rails 88 are slidably supported on the lower rails 86 joined to the seat-cushion mount floor 82. Although not illustrated in the drawings, the seat cushion 20 is provided with a holding mechanism that fixes and holds the seat cushion 20 in position on the slide rails 84. By releasing the holding mechanism and manually sliding the seat cushion 20 in the forward (FWD) direction of the vehicle, the seat cushion 20 can be moved from the seat-cushion normal position 20A to the seat-cushion reclining position 20B.

Next, the seat back 30 will be described in more detail. As shown in FIG. 1 and FIG. 2, the seat back 30 provides a backrest for the seated person M. Although not illustrated in the drawings, the seat back 30 has a skeleton framework covered with a seat pad formed of a foam, and a skin or cover is placed over the seat pad. Also, a lumbar support, seat heater, ventilator, sensor(s), etc. are mounted as needed within the seat back 30. The seat back 30 is mounted along the vehicle-body wall 80 that is inclined rearward of the vehicle so as to define the luggage compartment. Also, an engaging protrusion 110 is formed on a side portion of the seat back 30. On the other hand, an engaging slot 112 is formed in the vertical direction in a side wall of the vehicle body which faces the engaging protrusion 110. The seat back 30 is pivotable about the engaging protrusion 112. The seat back 30 is supported on the vehicle body such that its movements in the vertical and longitudinal directions of the vehicle are restricted by engagement of the engaging protrusion 110 with the engaging slot 112. The engaging protrusion 110 may be provided on the vehicle body, and the engaging slot 112 may be formed in a side portion of the seat back 30. The position of the engaging protrusion 110 as shown in FIG. 1 is established when the seat back 30 is in the seat-back normal position 30A, and the engaging protrusion placed in this position is designated by reference numeral 110A. When the seat back 30 is placed in the seat-back reclining position 30B, the engaging protrusion 110 is guided by the engaging slot 112, and placed in the position as shown in FIG. 2. The engaging protrusion placed in the position of FIG. 2 is designated by reference numeral 110B.

Next, the link mechanism 90 provided as a mechanical coupling mechanism will be described. The link mechanism 90 couples the seat back 30 and the seat cushion 20 to each other, and also couples the seat back 30 and the seat cushion 20 to the vehicle-body structure. The link mechanism 90 consists principally of a straight link 92 and an L-shaped link 100. The straight link 92 and the L-shaped link 100 move in relation to each other, so that the seat cushion 30 and the seat cushion 20 move in relation to each other so that the position of the vehicle seat 10 can be changed from the normal position 10A to the reclining position 10B.

The above-mentioned straight link 92 couples each of the lower rails 86 and the seat cushion 20 so as to support a front end portion of the seat cushion 20. Also, the straight link 92 is arranged to move in relation to the L-shaped link 100 (which will be described later) so that the position of the seat cushion 20 is changed from the seat-cushion normal position 20A to the seat-cushion reclining position 20B.

The straight link 92 is a strip-like member made of metal, and is formed at its opposite ends with holes that allow the link 92 to be pivotably attached to the lower rail 86. The straight link 92 is provided at its one end with a lower-rail pivot point 94, and is pivotably attached to each of the lower rails 86 such that the link 92 can pivot about the pivot point 94. The straight link 92 may be arranged to be pivotally attached to a vehicle-body structure other than the lower rail 97. The straight link 92 is provided at the other end with a seat-cushion front-end pivot point 96, and is attached to the lower surface of the front end portion of the seat cushion 20 such that the link 92 can pivot about the pivot point 96. When the seat cushion 20 is placed in the seat-cushion normal position 20A, the straight link 92 is placed in a position 92A in which the link 92 is inclined rearward of the vehicle, and the seat-cushion front-end pivot point 96 is located at this time at a seat-cushion front-end pivot point 96A as shown in FIG. 1. When the seat cushion 20 is placed in the seat-cushion reclining position 20B, the straight link 92 is placed in a position 92B as shown in FIG. 2 where the link 92 stands upright or rises upward of the vehicle, and the seat-cushion front-end pivot point 96 is located at this time at a seat-cushion front-end pivot point 96B as shown in FIG. 2.

The L-shaped link 100 will be now explained. As shown in FIG. 1 and FIG. 2, the L-shaped link 100 couples and supports the seat back 30 and the seat cushion 20 to each other, and is operable to move the seat back 30 and the seat cushion 20 in relation to each other so as to change the position of the vehicle seat 10 between the normal position 10A and the reclining position 10B. The L-shaped link 100 is formed by bending a strip-like metallic member into generally L shape, and is formed at its opposite ends with holes. The L-shaped link 100 is provided at its one end with a seat-back pivot point 102, and is pivotably attached to a lower end portion of the skeleton framework of the seat back 30 such that the link 100 can pivot about the pivot point 102. The L-shaped link 100 is provided at the other end with a seat-cushion rear-end pivot point 104, and is pivotably attached to a lower surface of a rear end portion of the seat cushion 20 such that the link 100 can pivot about the pivot point 104. A bent portion of the L-shaped link 100 has an upper-rail pivot point 106, and the L-shaped link 100 is pivotably attached to each of the upper rails 88 of the slide rails 84 such that the link 100 can pivot about the pivot point 106.

When the vehicle seat 10 is placed in the normal position 10A, the L-shaped link 100 is placed in a position 100A as shown in FIG. 1. When the vehicle seat 10 is placed in the reclining position 10B, the L-shaped link 100 is placed in a position 100B as shown in FIG. 2. Also, when the vehicle seat 10 is placed in the normal position 10A, the seat-back pivot point 102 is located at a seat-back pivot point 102A as shown in FIG. 1. When the vehicle seat 10 is placed in the reclining position 10B, the seat-back pivot point 102 is located at a seat-back pivot point 102B as shown in FIG. 2. Also, when the vehicle seat 10 is placed in the normal position 10A, the seat-cushion rear-end pivot point 104 is located at a seat-cushion rear-end pivot point 104A as shown in FIG. 1. When the vehicle seat 10 is placed in the reclining position 10B, the seat-cushion rear-end pivot point 104 is located at a seat-cushion rear-end pivot point 104B as shown in FIG. 1. Also, the upper-rail pivot point 106 is movable along the slide rail 84. When the vehicle seat 10 is placed in the normal position 10A, the upper-rail pivot point 106 is located at an upper-rail pivot point 106A as shown in FIG. 1. When the vehicle seat 10 is placed in the reclining position 10B, the upper-rail pivot point 106 is located an upper-rail pivot point 106B as shown in FIG. 2.

The operation of the vehicle seat constructed as described above according to this embodiment of the invention will be described. In the following, the operation of the vehicle seat 10 when its position is changed from the normal position 10A to the reclining position 10B will be described with reference to FIG. 3. The operation of the vehicle seat 10 when its position is changed from the reclining position 10B to the normal position 10A is the reverse of the operation as described below, and therefore will not be described in this specification.

Initially, the seated person M releases the holding mechanism (not shown) provided on the seat cushion 20 so as to slidingly move the seat cushion 20 supported on the slide rails 84 toward the front of the vehicle, as shown in FIG. 3. As a result, the upper rails 88 of the slide rails 84 slide in the forward direction of the vehicle. At this time, the L-shaped link 100 pivotably attached to each of the upper rails 88 slide on the slide rail 84 in the forward direction of the vehicle, while pivoting about the upper-rail pivot point 106 in the clockwise direction as viewed in FIG. 3. In this manner, the L-shaped link 100 slides from the position designated by the reference numeral 100A to the position designated by 100B. Also, the upper-rail pivot point 106 moves from the position designated by the reference numeral 106A to the position designated by 106B.

As the L-shaped link 100 slides in the above-described manner, the seat-cushion rear-end pivot point 104 of the L-shaped link 100 moves along the slide rail 84 in the forward direction of the vehicle, while pivoting about the upper-rail pivot point 106 in the clockwise direction as viewed in FIG. 3. As a result, the seat-cushion rear-end pivot point 104 moves from the position designated by the reference numeral 104A to the position designated by 104B which is located frontward and upward of the position 104A as viewed in the longitudinal and vertical directions of the vehicle. Also, the straight link 92 pivots about the lower-rail pivot point 94 and moves toward the front of the vehicle (in the counterclockwise direction as seen in FIG. 3). As a result, the seat-cushion front-end pivot point 96 moves from the position designated by the reference numeral 96A to the position designated by 96B which is located frontward and upward of the position 96A as viewed in the longitudinal and vertical directions of the vehicle. With the seat-cushion rear-end pivot point 104 and the seat-cushion front-end pivot point 96 thus moved, the seat cushion 20 is lifted frontward and upward in the longitudinal and vertical directions of the vehicle, for change of its position.

The position of the seat cushion 20 relative to the hip point H is shifted frontward of the vehicle when the seat cushion 20 is placed in the seat-cushion reclining position 20B, as compared with the relative position of the seat cushion 20 when it is in the seat-cushion normal position 20A. Therefore, the ischial contact point Q at which the tuber of ischium of the seated person M contacts the seat cushion 20 when the vehicle seat 10 is in the normal position 10A (i.e., the seat cushion 20 is in the seat-cushion normal position 20A) can be kept at substantially the same position when the vehicle seat 10 is placed in the reclining position 10B (i.e., the seat cushion 20 is placed in the seat-cushion reclining position 20B), due to the above-mentioned associated movements of the seat cushion 20 and the seat back 30 and the resulting change in the position of the seat back 30 as will be described later.

With the movement of the L-shaped link 100, the seat-back pivot point 102 moves forward and downward of the vehicle from the position designated by the reference numeral 102A to the position designated by 102B. Also, the seat back 30 is inclined rearward of the vehicle while pivoting about the seat-back pivot point 102B. At this time, the engaging protrusion 110 is guided by the engaging slot 112 and moves from the position 110A to the position 110B, so that the position of the seat back 30 changes from the seat-back normal position 30A to the seat-back reclining position 30B.

The position of the seat back 30 relative to the hip point H is shifted downward of the vehicle and inclined rearward of the vehicle when the seat back 30 is placed in the seat-back reclining position 30B, as compared with the relative position of the seat back 30 when it is in the seat-back normal position 30A. Therefore, the back contact point P at which the back of the seated person M contacts the seat back 30 when the seated person M is seated in the vehicle seat 10 that is in the normal position 10A kept at substantially the same position when the vehicle seat 10 is placed in the reclining position 10B, due to the associated movements of the seat cushion 20 and the seat back 30 and the resulting change in the position of the seat cushion 20.

The movement of the hip point H of the seated person M due to change in the position of the vehicle seat is illustrated in FIG. 3. The hip point H is located at hip point HA when the vehicle seat 10 is in the normal position 10A, and is located at hip point HB when the seat 10 is in the reclining position 10B. Namely, the seated person M moves as if he/she were lifted forward and upward of the vehicle, due to changes in the positions of the seat back 30 and the seat cushion 20 caused by the operation of the link mechanism 90.

With the above arrangements, the seat back 30 and the seat cushion 20 move in relation to each other such that the position of the back contact point P of the seat back 30 and the position of the ischial contact point Q of the seat cushion 20 when the vehicle seat 10 (the seat back 30 and the seat cushion 20) is in the normal position 10A are kept substantially at the same positions when the vehicle seat 10 (the seat back 30 and the seat cushion 20) is placed in the reclining position 10B. Therefore, the "back displacement" and "hip displacement" of the seated person M can be eliminated. Namely, the position of the seated person M on the vehicle seat 10 when the person M is seated in the seat 10 that is in the normal position 10A does not substantially change even when the position is changed to the reclining position; therefore; the seated person M will not feel uncomfortable. Also, the inconvenience of, for example, re-sitting in the seat resulting from the "back displacement" or "hip displacement" is eliminated. Where the vehicle seat is equipped with, for example, a lumbar support, seat heater, ventilator, sensor(s), and the like, the positions of these devices relative to the seated person M will not change even when the seat is moved from the normal position to the reclining position.

The above-mentioned linked position-changing unit is arranged to couple the seat back 30 and the seat cushion 20 to each other by way of the link mechanism 90 and move the seat back 30 and the seat cushion 20 in relation to each other. It is thus possible to eliminate the "back displacement" and "hip displacement" of the seated person M without requiring any complicated arrangement. As shown in FIG. 3, the position of the seat back 30 relative to the hip point H is shifted downward in the vertical direction of the vehicle and is inclined toward the rear of the vehicle when the vehicle seat 10 is placed in the reclining position, as compared with the relative position of the seat back 30 when the seat 10 is in the normal position. In connection with the movement of the seat back 30, the position of the seat cushion 20 relative to the hip point H is shifted frontward in the longitudinal direction of the vehicle. Thus, the movement of the hip point H of the seated person M due to changes in the positions of the seat back 30 and the seat cushion 20 is not limited to sliding movement toward the front of the vehicle along the slide rail 84, as is the case with a conventional hip point HR Namely, the amount of movement of the hip point H of the seated person M is divided into those of movements in the vehicle longitudinal direction and the vehicle vertical direction, resulting in a substantial reduction in the amount of movement of the hip point H in the vehicle longitudinal direction. Consequently, reduction in the space in front of the toes of the seated person M a when the vehicle seat 10 is brought into the reclining position 10B can be lessened or curbed. More specifically, the amount of forward movement of the hip point HP required to place the conventional vehicle seat in the reclining position is 115 mm, whereas the amount of the forward movement required in the first embodiment is only 55 mm, which means that the space in the vehicle compartment is substantially increased by about 60 mm as measured in the longitudinal direction of the vehicle. To lessen the reduction in the space in front of the toes of the seated person M leads to a substantial increase in the space within the vehicle compartment and a resultant reduction in the wheelbase of the vehicle; therefore, advantageous effects, such as reductions in the vehicle weight and cost, may be expected.

In the reclining arrangement of the conventional vehicle seat, the height or vertical position of the eyes (which may be called "eye point") of the seated person M is undesirably lowered since the head of the seated person M sinks downward due to the inclination of the seat back. As the seat back is inclined, the space above the head of the seated person M increases. Therefore, when the vehicle seat reclines, no problem in terms of the space in the vehicle compartment occurs even if the seated person M is seated at a higher position than that of the seated person M seated in the seat in the normal position. In the first embodiment, the seated person M moves as if he/she were lifted frontward and rearward of the vehicle, due to changes in the positions of the seat back 30 and the seat cushion 20 caused by the operation of the link mechanism 90. Therefore, the height or vertical position of the eyes of the seated person M is less likely or unlikely to be lowered.

Figure 4:
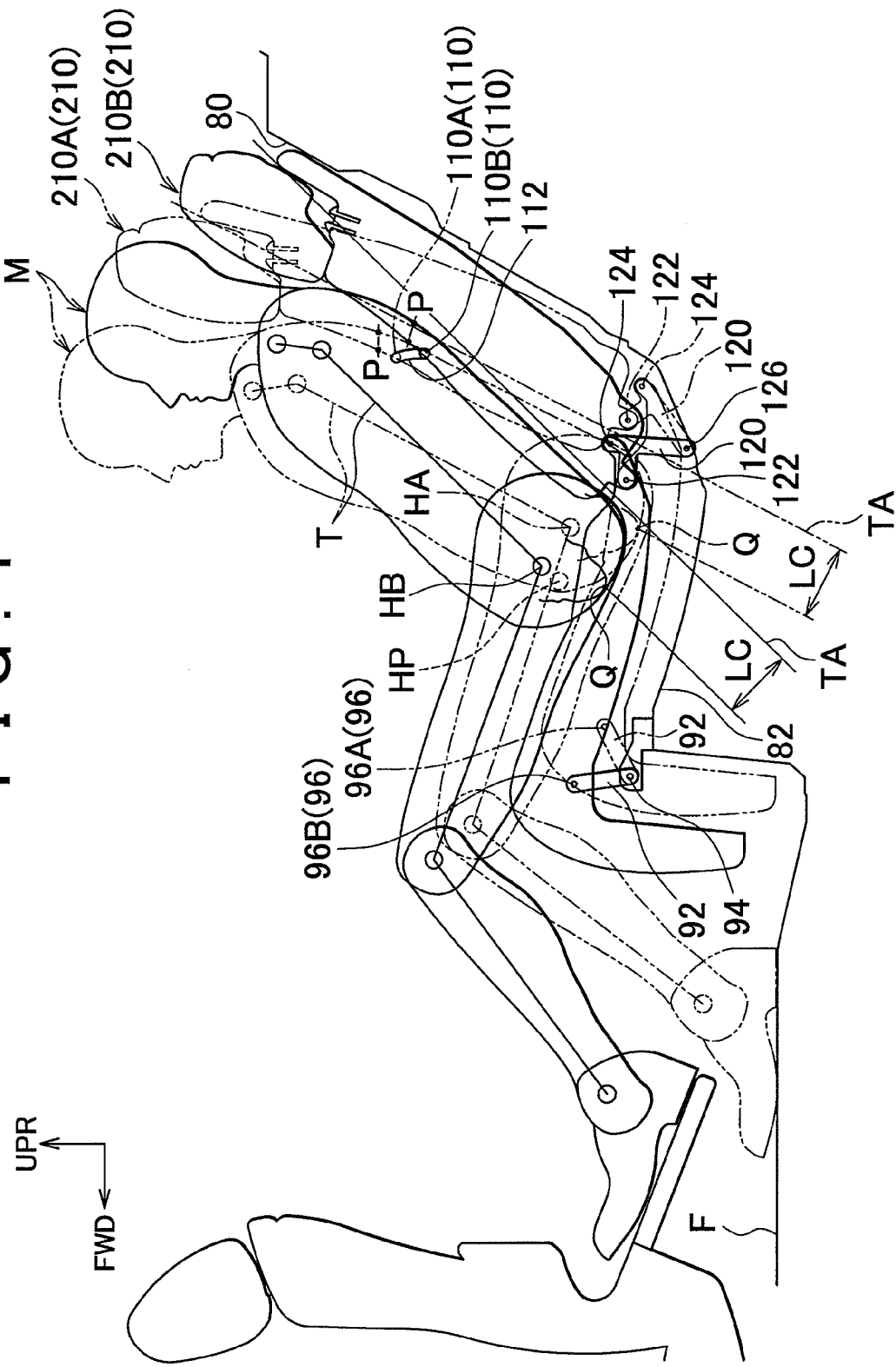
FIG. 4 is a schematic view useful for explaining the reclining motion of a vehicle seat according to a second embodiment of the invention.

Referring next to FIG. 4, the construction of a vehicle seat as a second embodiment of the invention as viewed with reference to the hip point will be described. FIG. 4 is a schematic view useful for explaining the reclining motion of the vehicle seat 210 according to the second embodiment. In FIG. 4, the same reference numerals as those used in the first embodiment are used for identifying constituent elements or portions having substantially the same construction and operation as those of the vehicle seat 10 of the first embodiment, and these elements or portions will not be described. Namely, only the constituent elements or portions that are different from those of the first embodiment will be described in detail. As shown in FIG. 4, the construction of the vehicle seat 210 of the second embodiment is substantially identical with that of the vehicle seat 10 of the first embodiment, except that the vehicle seat 210 has a three-point link 120 in place of the L-shaped link 100 of the link mechanism 90.

In the second embodiment, the three-point link 120 is formed from a strip-like metallic member that projects in three radial directions and has three pivot points. The three-point link 120 is pivotably attached to the vehicle floor F such that the link 120 can pivot about a vehicle-floor pivot point 126 as one of the three pivot points. The three-point link 120 is also pivotably attached to a rear end portion of the seat cushion 20 such that the link 120 can pivot about a seat-cushion rear-end pivot point 124 as one of the remaining two pivot points which is located closer to the rear of the vehicle. The three-point link 120 is also pivotably attached to a lower end portion of the skeleton framework of the seat back 30 such that the link 120 can pivot about a seat-back pivot point 122 located closer to the front of the vehicle, as the remaining pivot point.

The operation of the vehicle seat 210 constructed as described above according to the second embodiment will be described. The three-point link 120 is arranged to change the position of the vehicle seat 210 between the normal position 210A and the reclining position 210B, through arcuate movements of the seat-back pivot point 122 and the seat-cushion pivot point 124 about the vehicle-floor pivot point 126. The other arrangements of the vehicle seat 210 are substantially identical with those of the vehicle seat 10 of the first embodiment, and thus will not be described herein. With the above arrangement, the three-point link 120 is able to change the position of the vehicle seat 210 between the normal position 210A and the reclining position 210B in the absence of an arrangement like the slide rails 84. It is thus possible to eliminate the "back displacement" and "hip displacement" of the seated person M without requiring any complicated arrangement. Also, the space in front of the toes of the seated person M is less likely to be reduced when the seat 210 is brought into the reclining position 210B.

Figure 5:
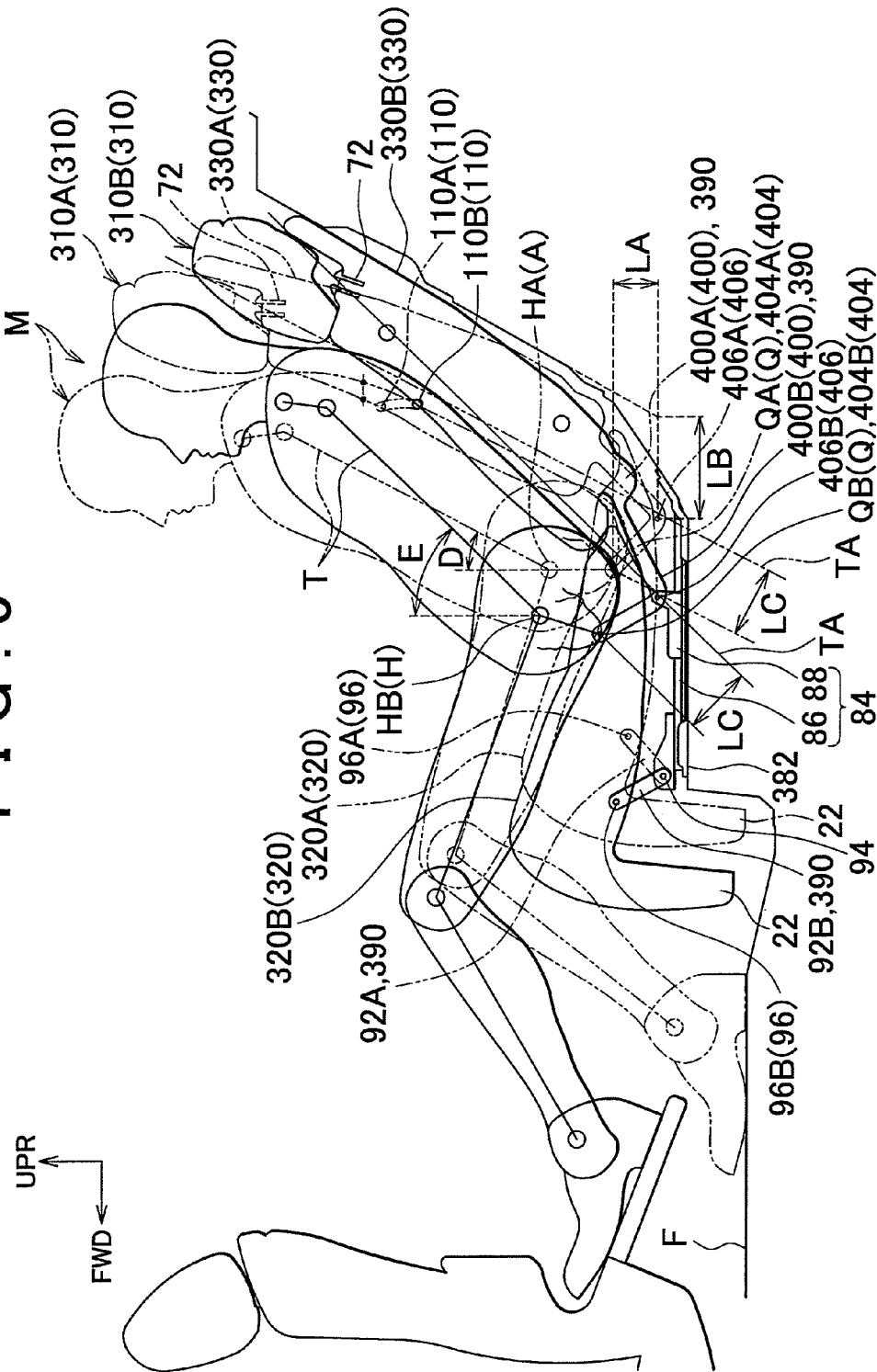
FIG. 5 is a schematic view useful for explaining the reclining motion of a vehicle seat according to a third embodiment of the invention.
Figure 6:
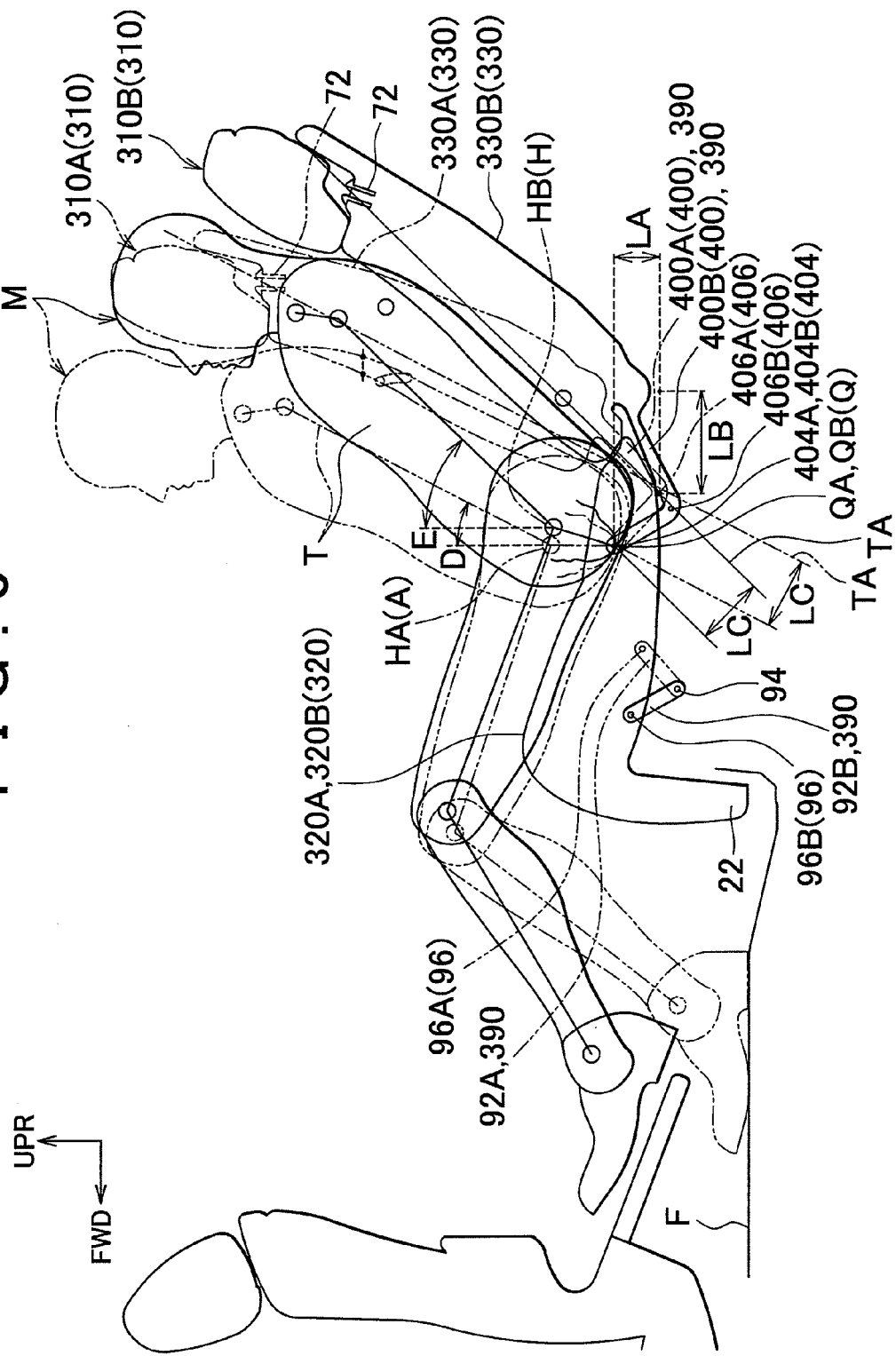
FIG. 6 is a schematic view showing the vehicle seat of the third embodiment in the normal position and the vehicle seat of the third embodiment in the reclining position, which are superimposed on each other with respect to the same ischial contact point.

Referring next to FIG. 5 and FIG. 6, the construction of a vehicle seat as a third embodiment of the invention as viewed with reference to the tuber-of-ischium point will be described. In FIG. 5 and FIG. 6, the same reference numerals as those used in the first embodiment are used for identifying constituent elements or portions having substantially the same construction and operation as those of the vehicle seat 10 of the first embodiment, and these elements or portions will not be described. Namely, only the constituent elements or portions that are different from those of the first embodiment will be described in detail.

In the above first and second embodiments, the construction of the vehicle seat as viewed with reference to the hip point, which is substantially free from the "back displacement" and "hip displacement", has been described. Here, the inventor of the present invention made a further study of a mechanism operable to change the positions of the seat back and the seat cushion while curbing the occurrence of the "back displacement" and "hip displacement". As a result, the inventor has developed a vehicle seat constructed as described below, namely, the construction of the vehicle seat that is substantially free from the "back displacement" and "hip displacement" from a point of view taking the tuber-of-ischium point as a reference point.

In response to a change in the position of the seat back while the seated person M is seated with his/her back being in contact with the seat back, the position of the seat cushion is also changed in relation to the change in the position of the seat back, without changing the position of the tuber of ischium of the seated person M relative to the seat cushion as seen in a side view of the seat cushion, so that the "back displacement" and "hip displacement" of the seated person M can be eliminated. In other words, the changes in the positions of the seat cushion and the seat back from the normal position to the reclining position cause substantially no "back displacement" nor "hip displacement" if the seat cushion and the seat back can pivot about the tuber-of-ischium point as seen in the side view of the seat cushion.

Suppose that the seat cushion does not operate to change its position and is held in a fixed position, for the sake of easy understanding of the above-described operation to change the seat position. In this condition, the tuber of ischium of the seated person M does not move at all, and therefore, no "hip displacement" will occur. In this condition, if the seat back can operate to change its position about the tuber of ischium, without changing the positional relationship with the tuber of ischium as seen in the side view of the seat cushion, no "back displacement" will occur. Accordingly, the changes in the positions of the seat cushion and the seat back from the normal position to the reclining position cause substantially no "back displacement" nor "hip displacement" if the seat back can pivot about the tuber of ischium as seen from the side view of the seat cushion so as to change its position.

Figure 11:
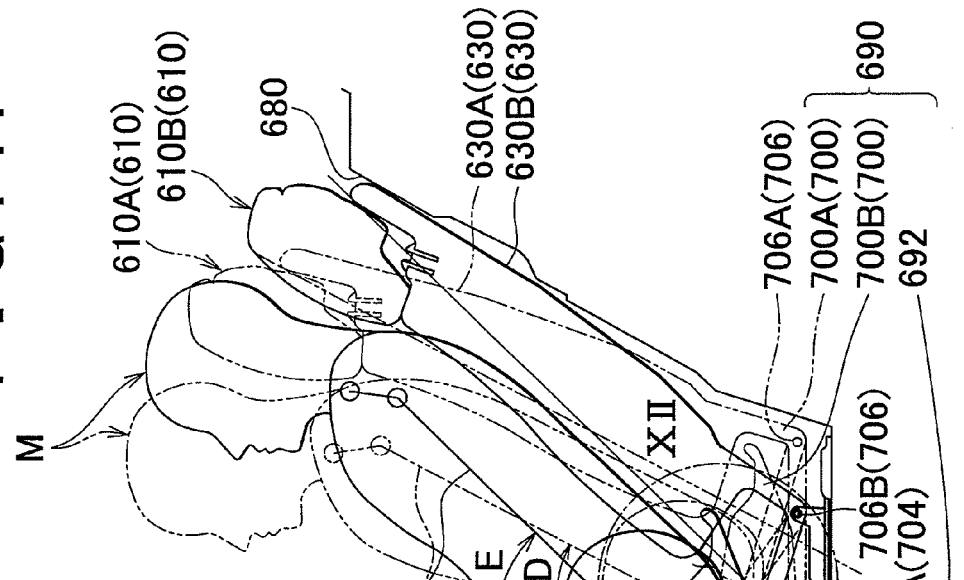
FIG. 11 is a schematic view useful for explaining the reclining motion of a vehicle seat as described in JP-A-7-327768.

In the following detailed description of the third embodiment, the features of the third embodiment will be explained by clarifying differences between the vehicle seat described in Japanese Patent Application Publication No. 7-327768 (JP-A-7-327768) and the vehicle seat of the third embodiment. First, the vehicle seat described in JP-A-7-327768 will be described. FIG. 11 is a schematic view showing the vehicle seat 610 of JP-A-7-327768 that is in the normal position and the vehicle seat 610 that is in the reclining position, which are superimposed on each other. In FIG. 11, constituent elements are illustrated in simplified forms, and the construction of the seat 610 is partially omitted. In FIG. 11, two-dot chain lines indicate the vehicle seat 610 that is in the normal position 610A, and solid lines indicate the vehicle seat 610 that is in the reclining position 610B.

As shown in FIG. 11, the vehicle seat 610 is provided as a rear seat in the second row or third row in the vehicle compartment, and consists principally of a seat back 630 on which the back of a seated person M rests, and a seat cushion 620 on which the seated person M is seated. The seat back 630 of the vehicle seat 610 is mounted along a vehicle-body wall 680 formed as a part of a vehicle-body structure, such as a luggage compartment, and there is substantially no space behind the seat back 630. Therefore, the seat back 630 cannot be inclined rearward while the seat cushion 620 is in a non-moving or stationary condition.

As described above, the reclining motion of the seat back 630 is limited by the layout of the vehicle compartment. Therefore, a space is formed between the seat back 630 and the wall of the vehicle-body structure, such as a luggage compartment, by sliding the seat cushion 620 forward, so that the seat back 630 coupled to the seat cushion 620 is allowed to recline into the space thus formed. The vehicle seat 610 further includes a link mechanism 690 for coupling the seat cushion 620 and the seat back 630 to each other. By operating the link mechanism 690 to move the seat cushion 620 up and down, the amount of displacement of the back contact point on the seat back between the vehicle seat 610 in the normal position 610A and the vehicle seat 610 in the reclining position 610B is reduced.

The link mechanism 690 for coupling the seat back 630 and the seat cushion 620 is also coupled to the vehicle-body structure. The link mechanism 690 consists principally of a straight link 692 and an L-shaped link 700. With the two links 692, 700 moving in relation to each other, the position of the vehicle seat 610, or those of the seat back 630 and the seat cushion 620, can be changed from the normal position 610A to the reclining position 610B.

The straight link 692 is a strip-like member made of metal, and is formed at its opposite ends with holes. The straight link 692 is pivotably attached at one end to the vehicle-body floor F. The straight link 692 is provided at the other end with a seat-cushion front-end pivot point 696, and is pivotably attached to a front end portion of the seat cushion 620 such that the link 692 can pivot about the pivot point 696. Also, the straight link 692 and the L-shaped link 700 (which will be described later) move in relation to each other so as to change the position of the seat cushion 620 from a seat-cushion normal position 620A to a seat-cushion reclining position 620B. At this time, the straight link 692 pivots about a lower-rail pivot point 694 (which will be described later) so as to lift the front end portion of the seat cushion 620 upward.

The L-shaped link 700 moves along with the straight link 692 so as to change the position of the seat back 630 from a seat-back normal position 630A to a seat-back reclining position 630B. The L-shaped link 700 is formed by bending a strip-like metallic member into the general shape of the letter L. The L-shaped link 700 is rigidly coupled at one end to a lower end portion of the skeleton framework of the seat back 630, and is fixed at the one end to the seat back 630. The L-shaped link 700 is provided at the other end with a seat-cushion rear-end pivot point 704, and is pivotably attached at the other end to the lower surface of a rear end portion of the seat cushion 620. Also, a bent portion of the L-shaped link 700 serves as an upper-rail pivot point 706, and is pivotably attached to each of upper rails 688 of slide rails 684.

Here, the positions of the seat-cushion rear-end pivot point 704 and upper-rail pivot point 706 of the L-shaped link 700 will be described. The upper rails 688 are arranged to slide in the longitudinal direction and horizontal direction of the vehicle. The upper-rail pivot point 706 is located at a position of intersection between the track of the sliding movement of the upper rail 688 and a line (or extension) that extends along the back face of the seat back toward the lower end thereof. The seat-cushion rear-end pivot point 704 is located frontward of the upper-rail pivot point 706 as viewed in the upper-rail sliding direction or longitudinal direction of the vehicle.

The operation of the vehicle seat 610 will be now described. As shown in FIG. 11, the seated person M releases a holding mechanism (not shown) provided on the seat cushion 620 so as to slide the seat cushion 62 supported on the slide rails 684 toward the front of the vehicle. As a result, the upper rails 688 of the slide rails 684 slide in the forward direction of the vehicle. During the sliding movement, the L-shaped link 700 pivotably attached to the upper rail 688 moves/slides in the forward direction of the vehicle on the slide rail 684, while pivoting about the upper-rail pivot point 706 in the clockwise direction as viewed in FIG. 11. In this manner, the L-shaped link 700 moves/slides from the position designated by reference numeral 700A (in FIG. 11) to the position designated by 700B. Also, the upper-rail pivot point 706 moves from the position designated by reference numeral 706A to the position designated by 706B.

With the sliding movement of the L-shaped link 700, the seat-cushion rear-end pivot point 704 of the L-shaped link 700 pivots about the upper-rail pivot point 706 in the clockwise direction as viewed in FIG. 11, and moves along the slide rail 684 in the forward direction of the vehicle. In this manner, the seat-cushion rear-end pivot point 704 moves forward and upward of the vehicle from the position designated by reference numeral 704A to the position designated by 704B. The straight link 692 is pivotably attached at one end as the lower-rail pivot point 694 to each of the lower rails 686 joined to the vehicle-body floor F such that the link 692 can pivot about the lower-rail pivot point 694. The straight link 692 may be pivotably attached to a vehicle-body structure other than the lower rails 686. The straight link 692 is also pivotably attached at the other end as the seat-cushion front-end pivot point 696 to the lower surface of the front end portion of the seat cushion 620 such that the link 692 can pivot about the seat-cushion front-end pivot point 696. When the position of the vehicle seat 610 changes from the normal position 610A to the reclining position 610B, the straight link 692 moves in the forward direction of the vehicle while pivoting about the lower-rail pivot point 694 in the counterclockwise direction as viewed in FIG. 11. As a result, the seat-cushion front-end pivot point 696 moves forward and upward of the vehicle from the position designated by reference numeral 696A to the position designated by 696B. Accordingly, the seat cushion 620 is moved forward of the vehicle and lifted upward of the vehicle due to the above-described movements of the seat-cushion rear-end pivot point 704 and the seat-cushion front-end pivot point 696.

Figure 12:
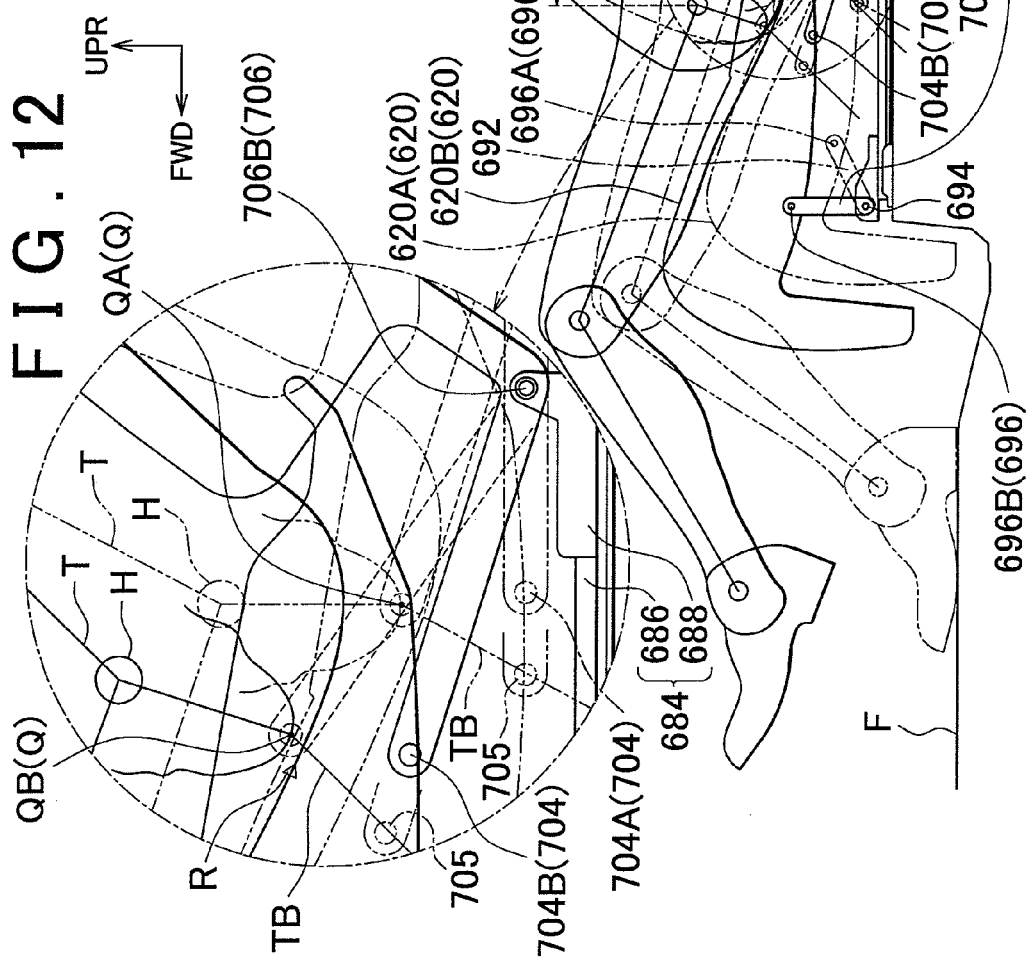
FIG. 12 is an enlarged view showing a part of the vehicle seat of FIG. 11.

Here, the positional relationship between the ischial contact point Q on the seat cushion of the vehicle seat 610 in the normal position 610A and that of the vehicle seat 610 in the reclining position 610B will be considered. In FIG. 12, the ischial contact point Q of the vehicle seat 610 in the normal position 610A is denoted as an ischial contact point QA, and the ischial contact point Q of the vehicle seat 610 in the reclining position 610B is denoted as an ischial contact point QB. As shown in FIG. 12, the ischial contact point Q, which moves while keeping a certain relationship with the hip point H, is located at the reclining-position ischial contact point QB when the vehicle seat 610 is placed in the reclining position 610B.

On the other hand, the position of the seat cushion 620 at which the ischial contact point Q is located when the vehicle seat 610 is in the normal position 610A moves to a seat-cushion reference position R when the vehicle seat 610 is placed in the reclining position 610B, as the seat-cushion rear-end pivot point 704 moves forward and upward of the vehicle from the position designated by 704A to the position designated by 704B. Therefore, a "hip displacement" appears due to a difference between the reclining-position ischial contact point QB and the seat-cushion reference position R.

Next, the manner of changing the position of the seat back 630 will be explained. In FIG. 12, reference line TB represents "a line that is in parallel with the torso line T and passes the ischial contact point". Suppose the seat-cushion rear-end pivot point 704 of the L-shaped link 700 lies on the reference line TB (at a position designated by reference numeral 705). In this case, the positional relationship between the seat back 630 of the vehicle seat 610 in the normal position 610A and the normal-position ischial contact point QA as seen in a side view of the seat cushion 620 is the same as the positional relationship between the seat back 630 of the vehicle seat 610 in the reclining position 610B and the reclining-position ischial contact point QB as seen in the side view of the seat cushion 620. Namely, the position of the seat back 630 is changed such that the seat back 630 pivots about the ischial contact point QA and the ischial contact point QB; therefore, no "back displacement" appears. Thus, the length of the link from the upper-rail pivot point 706 to the seat-cushion rear-end pivot point 704 may be set so that the L-shaped link 700 of the vehicle seat 610 described in JP-A-7-327768 is positioned so as not to cause the "back displacement".

However, the "hip displacement" takes place, as described above; therefore, it may be proposed to shape the L-shaped link 700 as indicated by broken lines in FIGS. 11 and 12. Namely, the position of the seat-cushion rear-end pivot point 704 of the L-shaped link 700 is set to the position of the ischial contact point Q as seen in the side view of the seat cushion 620. In this case, the position of the seat cushion 620 can be changed such that the seat cushion 620 pivots about the ischial contact point Q. Also, the position of the seat back 630 can be changed such that the seat back 630 pivots about the normal-position ischial contact point QA and the reclining-position ischial contact point QB, without changing the positional relationship with the normal-position ischial contact point QA and the reclining-position ischial contact point QB as seen in the side view of the seat cushion 620. Accordingly, no "back displacement" nor "hip displacement" takes place.

However, there is a problem encountered in the vehicle seat 610 of JP-A-7-327768 that the amount of movement of the hip point H as measured in the vertical direction between the normal position 610A and the reclining position 610B is large. In this connection, it is pointed out that as the seat back reclines, the head of the seated person M sinks downward, and the height (or vertical position) of the eyes of the seated person M (which may also be called "eye point") is lowered. With regard to this point, since the seat cushion of the vehicle seat 610 is moved forward and lifted upward when the seat 610 is placed in the reclining position 610B, variations in the eye point may be reduced if the amount of movement of the hip point H in the vertical direction is further increased. However, if the seat cushion 620 is excessively lifted upward in the reclining position 610B, the seated person M may feel uncomfortable because the feet of the person M fail to reach the vehicle floor, and a new problem may occur.

In the vehicle seat 310 according to the third embodiment of the invention, as shown in FIG. 5 and FIG. 6, the positions of the seat back 330 and the seat cushion 320 can be changed without causing any "back displacement" and "hip displacement", and, furthermore, the amount of movement of the hip point H in the vertical direction can be reduced. These arrangements are achieved by a linked position-changing unit in the form of a link mechanism 390 provided in the vehicle seat 310. The link mechanism 390 consists of a straight link 92 and an L-shaped link 400. FIG. 5 is a schematic view useful for explaining the reclining motion of the vehicle seat 310 according to the third embodiment. In FIG. 5, constituent elements of the vehicle seat 310 are illustrated in simplified forms, and the construction of the seat 310 is partially omitted. FIG. 5 shows the vehicle seat 310 that is in a normal position 310A and the vehicle seat 310 that is in a reclining position 310B, which are superimposed on each other. FIG. 6 is a schematic view showing the vehicle seat 310 of the third embodiment in the normal position 310A and the vehicle seat 310 in the reclining position 310B, which are superimposed on each other with respect to the same ischial contact point Q.

As shown in FIG. 5, the shape of the L-shaped link 400 is determined under the following conditions, so that the position of the seat cushion 320 can be changed without causing any "hip displacement", and the amount of movement of the hip point H in the vertical direction between the normal position 310A and the reclining position 310B is reduced.

One of the conditions is that the seat-cushion rear-end pivot point 404 is located at the same position as the ischial contact point Q as seen in the side view of the seat cushion 320. With this arrangement, the position of the seat cushion 320 is changed such that the seat cushion 320 pivots about the ischial contact point Q; therefore, the positional relationship between the seat cushion 320 and the ischial contact point Q does not change, and no "hip displacement" appears. A second condition or point to be considered is that the amount of sliding movement of the upper-rail pivot point 406 increases as the vertical distance LA between the position of the seat-cushion rear-end pivot point 404 (the ischial contact point Q) and the track of the sliding movement of the upper-rail pivot point 406. A third condition or point to be considered is that, as the horizontal distance LB between the upper-rail pivot point 406 and a point of intersection between the track of sliding movement of the upper-rail pivot point 406 and a downward extension from the back face of the seat back 330 (i.e., a line that extends toward the lower end along the back face of the seat back 330) increases, the amount of movement of the hip point H in the vertical direction between the normal position 310A and the reclining position 310B is reduced.

Next, a condition under which the position of the seat back 330 is changed without causing any "back displacement" is that the distance between the back contact point P and the ischial contact point Q when the vehicle seat 310 is in the normal position 310A is substantially equal to the distance between the back contact point P and the ischial contact point Q when the vehicle seat 310 is in the reclining position 310B. In other word, the condition is that the position of the seat back 330 is changed around the ischial contact point Q without changing the positional relationship between the seat back 330 and the ischial contact point Q as seen in the side view of the seat cushion 320. As shown in FIG. 5, reference lines are provided in the seat back 330, and the positional relationship between the seat back 330 and the ischial contact point Q as seen in the side view of the seat cushion 320 will be explained using the reference lines. Generally, seat-back reference lines TA are provided in view of the relationship with the torso line T of the seated person M. Thus, the seat-back reference line TA is defined as a "line that passes the center of the headrest support 72 and is in parallel with the torso line T". The vertical distance LC between the seat-back reference line TA and the ischial contact point Q does not vary between the normal position 310A and the reclining position 310B. Therefore, the positional relationship between the seat back 330 and the ischial contact point Q as seen in the side view of the seat cushion 320 does not change.

The shape of the L-shaped link 400 of this embodiment is determined as follows, based on the conditions as described above. The shape formed by connecting the upper-rail pivot point 406 and the seat-cushion rear-end pivot point 404 of the L-shaped link 400, with the position at which the L-shaped link 400 is joined to the seat back 330, is a right triangle having a generally right angle at the upper-rail pivot point 406 where the L-shaped link 400 is bent. Also, the length of one arm of the L-shaped link 400 which extends between the upper-rail pivot point 406 and the seat-cushion rear-end pivot point 404 is substantially the same as the length of the other arm of the link 400 which extends between the upper-rail pivot point 406 and the position at which the L-shaped link 400 is joined to the seat back 330. Also, the seat-cushion rear-end pivot point 404 is located at substantially the same position as the ischial contact point Q as seen in the side view of the seat cushion 320.

The operation of the vehicle seat 310 according to the third embodiment of the invention will be described. In the first and second embodiments, the seat-cushion mount floor 82 is gently inclined upward of the vehicle from the rear end to the front end of the seat cushion 20 (i.e., toward the front of the vehicle). In the third embodiment, a seat-cushion mount floor 382 is formed substantially horizontally, in parallel with the vehicle-body floor F, but the vehicle seat 310 of the third embodiment may be mounted on either type of seat-cushion mount floor. As shown in FIG. 5, the seated person M releases a holding mechanism (not shown) provided on the seat cushion 320, and slides the seat cushion 320 supported on the slide rails 84 toward the front of the vehicle. As a result, the upper rails 88 of the slide rails 84 slide in the forward direction of the vehicle. At this time, the L-shaped link 400 pivotably attached to each of the upper rails 88 slides on the slide rail 84 in the forward direction of the vehicle, while pivoting in the clockwise direction as viewed in FIG. 5 about the upper-rail pivot point 406. In this manner, the L-shaped link 400 moves from the position designated by reference numeral 400A to the position designated by 400B. Also, the upper-rail pivot point 406 moves from the position designated by reference numeral 406A to the position designated by 406B.

With the sliding movement of the L-shaped link 400, the seat-cushion rear-end pivot point 404 of the L-shaped link 400 moves along the slide rail 84 in the forward direction of the vehicle, while pivoting about the upper-rail pivot point 406 in the clockwise direction as viewed in FIG. 5. As a result, the seat-cushion rear-end pivot point 404 moves forward and upward of the vehicle from the position designated by reference numeral 404A to the position designated by 404B. Also, the straight link 92 moves toward the front of the vehicle while pivoting about the lower-rail pivot point 94 in the counterclockwise direction as viewed in FIG. 5. As a result, the seat-cushion front-end pivot point 96 moves forward and upward of the vehicle from the position designated by reference numeral 96A to the position designated by 96B. The movements of the seat-cushion rear-end pivot point 404 and the seat-cushion front-end pivot point 96 cause the seat cushion 32 to be moved forward in the longitudinal direction of the vehicle and lifted upward in the vertical direction of the vehicle.

Owing to the operation of the L-shaped link 400, the positions of the seat cushion 320 and the seat back 330 are changed from the normal position 310A to the reclining position 310B, such that the position of the seat cushion 320 relative to a mounting portion of, for example, the vehicle body is changed upward, at the same time that the position of the seat back 330 relative to a mounting portion of, for example, the vehicle body is changed downward, for associated changes in the positions of the seat cushion 320 and the seat back 330.

With the above arrangement, the linked position-changing unit is arranged to change the positions of the seat back 330 and the seat cushion 320 coupled to each other by the link mechanism 390, in relation to each other. Thus, a complicated arrangement is not required for associated changes in the positions, and the cost can be reduced. Also, while the seated person M is seated on the seat cushion 320 with his/her back in contact with the seat back 330, the position of the seat cushion 320 is changed in relation to the change in the position of the seat back 330, without changing the positional relationship between the seat cushion 320 and the tuber-of-ischium point of the seated person M as seen in the side view of the seat cushion 320; therefore, the "back displacement" and "hip displacement" of the seated person M can be eliminated. As shown in FIG. 6, the positions of the seat back 330 and the seat cushion 320 are changed from those of the normal position 310A to those of the reclining position 310B, by pivoting the seat back 330 and the seat cushion 320 about the ischial contact point Q as seen in the side view of the seat cushion 320. That is to say, the seat cushion 320 pivots about the seat-cushion rear-end pivot point 104 at which the seat cushion 320 is coupled to the L-shaped link 100. The seat-cushion rear-end pivot point 104 is located at the same position as the ischial contact point Q as seen in the side view of the seat cushion 320. The seat back 330 pivots about the seat-cushion rear-end pivot point 104 via the L-shaped link 100.

Since the upper-rail pivot point 406 is spaced by the horizontal distance LB from the position of the intersection between the downward extension of the line that extends along the back face of the seat back 330 and the track of sliding movement of the upper rail, the amount of movement of the hip point H in the vertical direction between the normal position 310A and the reclining position 310B can be reduced.

The positions of the seat cushion 320 and the seat back 330 are changed from those of the normal position 310A to those of the reclining position 310B, such that the position of the seat cushion 320 relative to a mounting portion of, for example, the vehicle body is changed upward, at the same time that the position of the seat back 330 relative to a mounting portion of, for example, the vehicle body is changed downward, for associated changes in the positions of the seat cushion 320 and the seat back 330. Therefore, no "displacement" appears between the back contact point P and the ischial contact point Q when the vehicle seat 310 is in the normal position 310A and the back contact point P and the ischial contact point Q when the vehicle seat 310 is in the reclining position 310B. In addition, the change in the position of the seat cushion 320 and the change in the position of the seat back 330 take place at the same time in a linked fashion or in relation to each other; therefore, the positions of the seat back 330 and the seat cushion 320 can be changed without causing any "back displacement" and "hip displacement" even during the changes in the positions from the normal position 310A to the reclining position 310B. Accordingly, the seated person M feels more comfortable when the vehicle seat 310 reclines.

The above-described arrangement in which the vertical distance LS between the seat-back reference line TA and the ischial contact point Q does not vary between the normal position 310A and the reclining position 310B and the arrangement in which the positional relationship between the seat back 330 and the ischial contact point Q as seen in the side view of the seat cushion 320 does not change are not limited to the third embodiment. The same arrangements or relationships are applied to the first and second embodiments, as shown in FIG. 1, FIG. 2 and FIG. 4.

Figure 7:
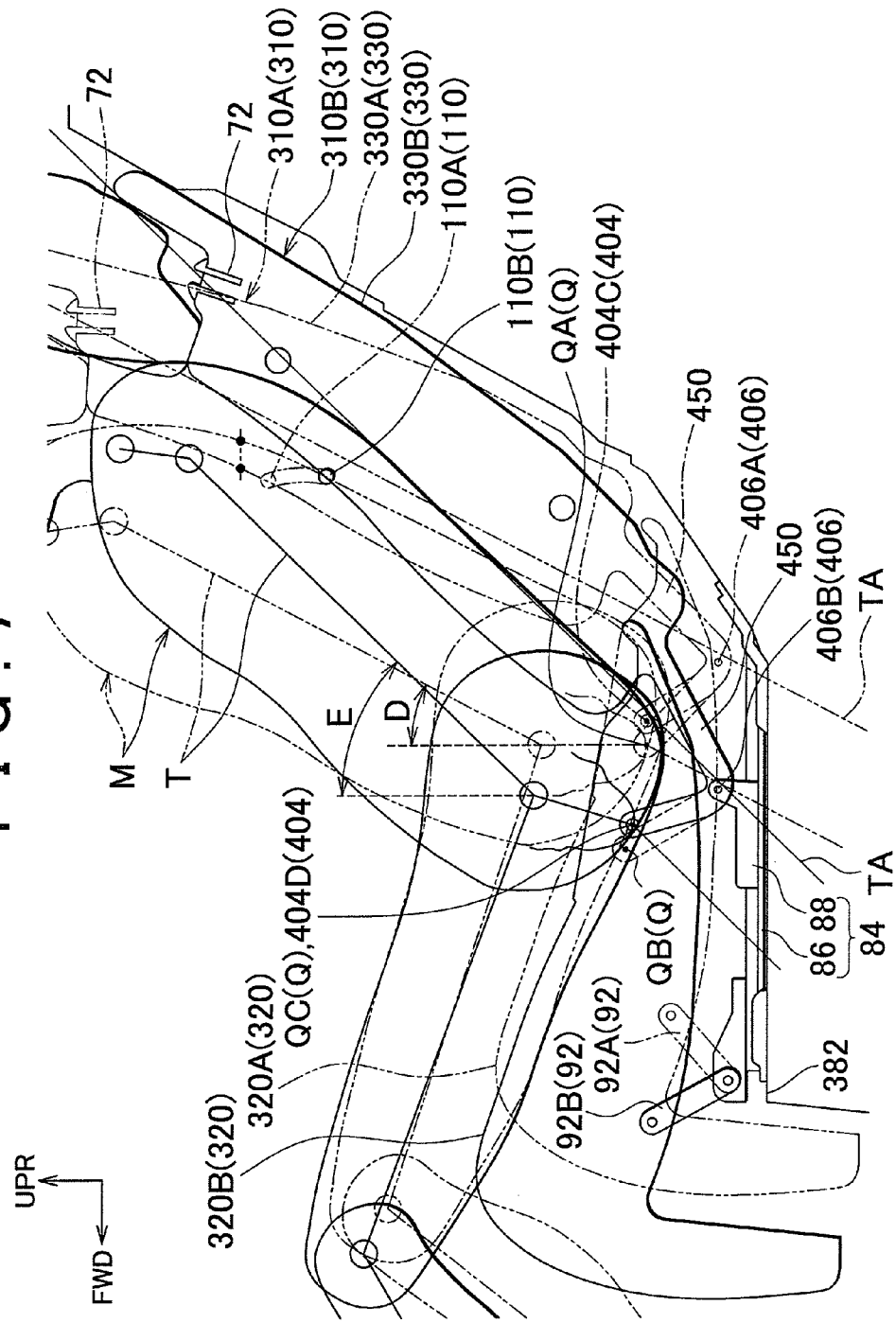
FIG. 7 is a schematic view useful for explaining the reclining motion of a vehicle seat as a modified example of the third embodiment of the invention.
Figure 8:
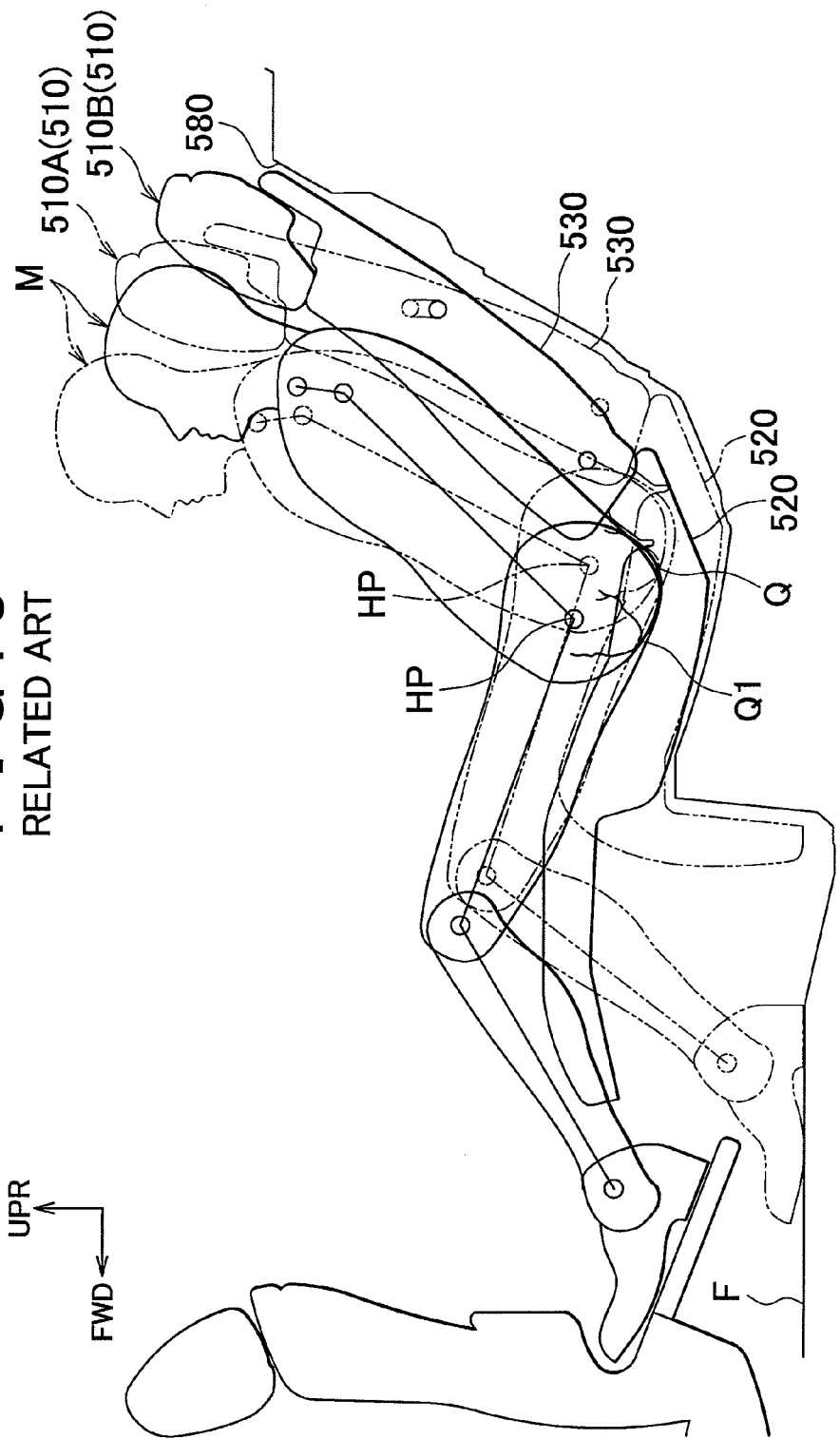
FIG. 8 is a schematic view useful for explaining the reclining motion of a known vehicle seat.
Figure 9:
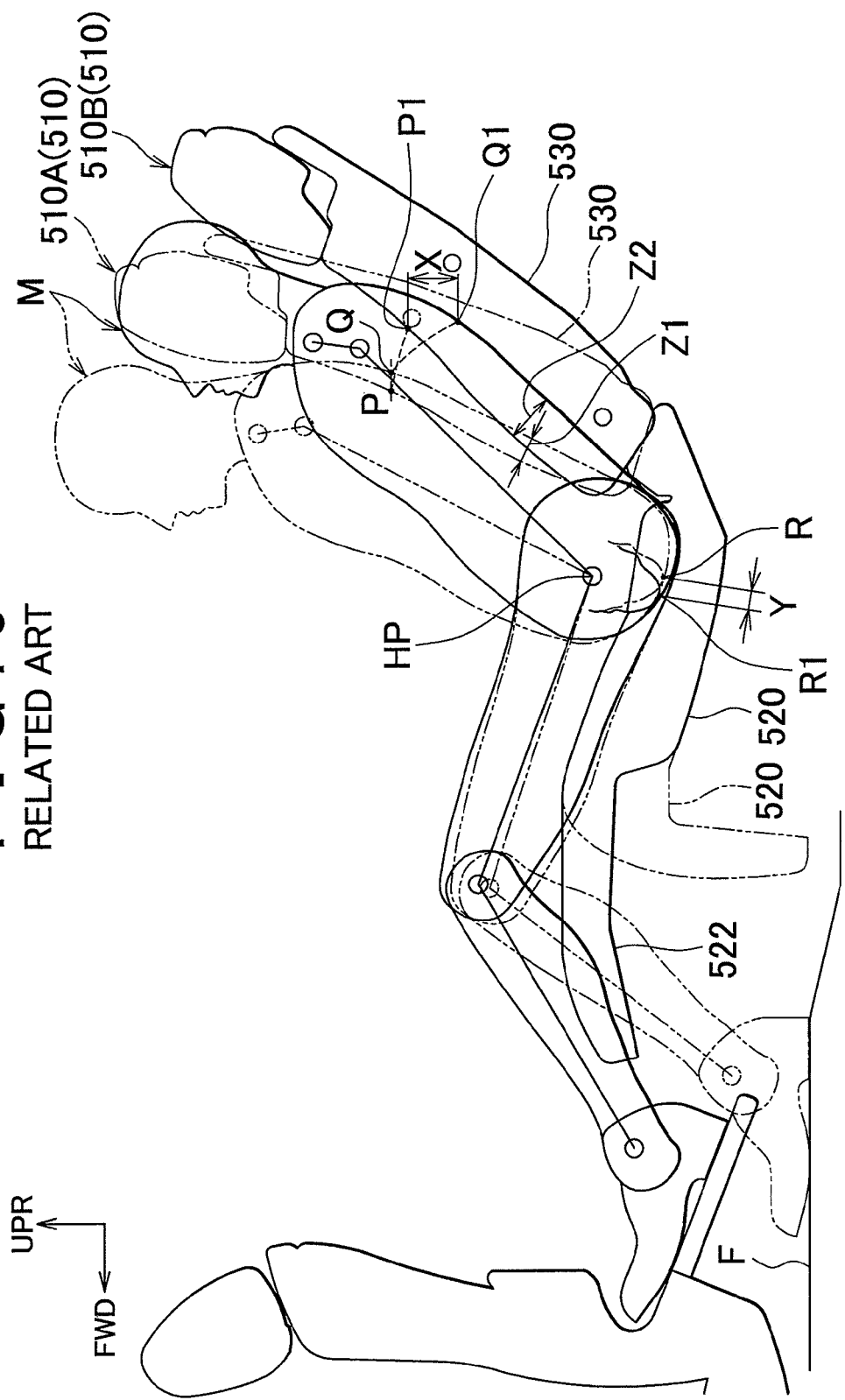
FIG. 9 is a schematic view showing the known vehicle seat in a normal position and the same seat in a reclining position, which are superimposed on each other with reference to the hip point.
Figure 10:
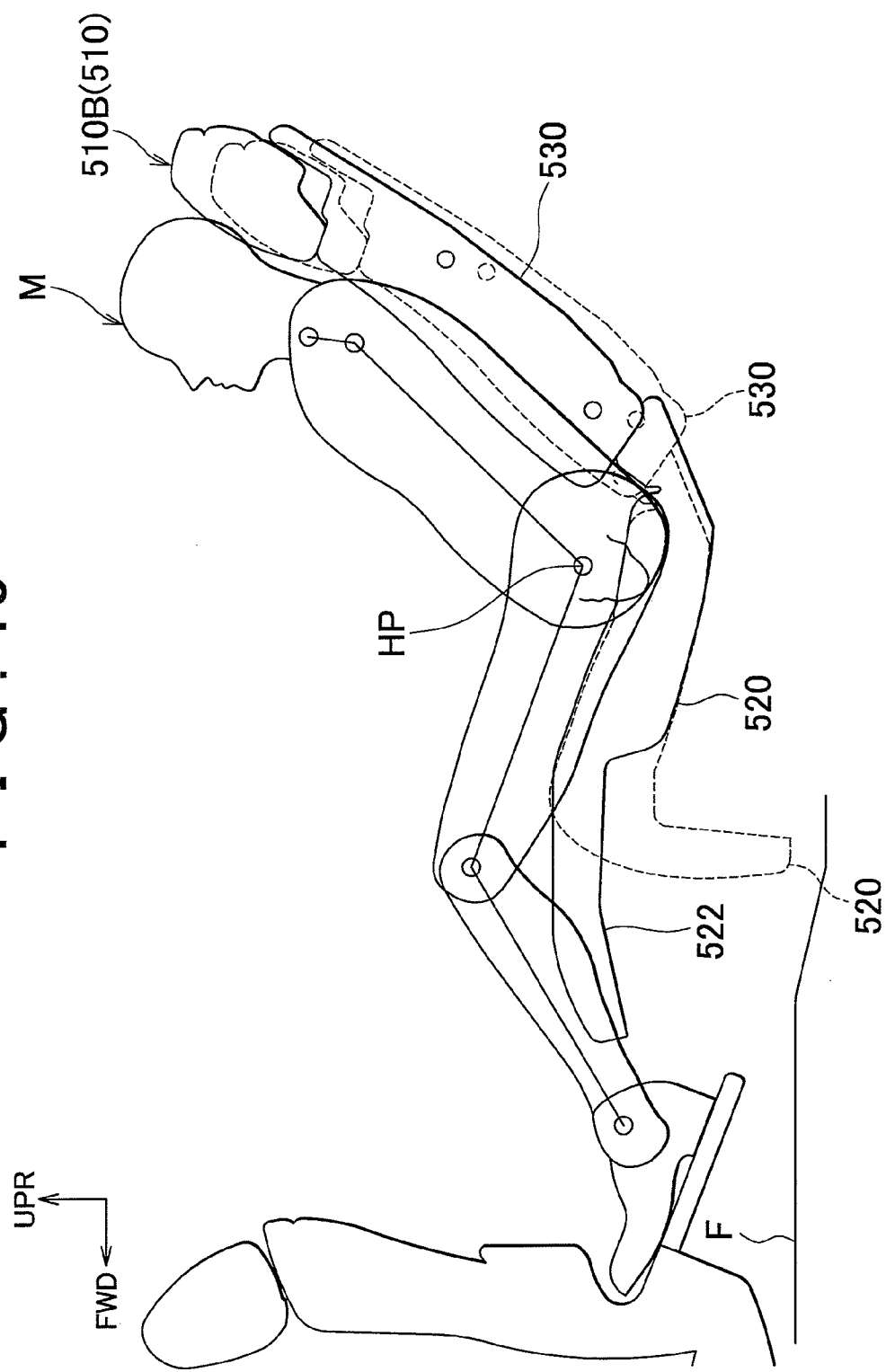
FIG. 10 is a schematic view showing the known vehicle seat and a vehicle seat that is free from back displacement and hip displacement, which seats are in reclining positions, and are superimposed on each other with reference to the hip point.

Next, a modified example of the third embodiment will be described. FIG. 7 is a schematic view useful for explaining the reclining motion of a vehicle seat as the modified example of the third embodiment. As shown in FIG. 7, when the positions of the seat cushion 320 and the seat back 330 are changed from the normal position 310A to the reclining position 310B, the posture of the seated person M relative to the seat cushion 320 and the seat back 330 changes. The change in the posture of the seated person M brings about variations or changes in the magnitudes of the loads of the seated person M on the seat cushion 320 and the seat back 330 and the directions in which the loads are applied to the seat cushion 320 and the seat back 330. As a result, the amounts of deformation of the seat cushion 320 and the seat back 330 vary, resulting in a "displacement" of the reclining-position ischial contact point QB corresponding to the amounts of deformation.

In the modified example, therefore, the position of the tuber-of-ischium point of the seated person M relative to the seat cushion 320 of the vehicle seat 310 in the normal position 310A and the position of the tuber-of-ischium point when the vehicle seat 310 is in the reclining position 310B are corrected in view of the amounts of deformation of the seat cushion 320 and the seat back 330 due to the load of the seated person M on them. The L-shaped link 400 is modified into an L-shaped link 450, for changing the positions of the seat cushion 320 and the seat back 330 in relation to each other in view of the amounts of deformation of the seat cushion 320 and the seat back 330.

As shown in FIG. 7, when the position of the vehicle seat 310 is changed to the reclining position 310B, the posture of the seated person M relative to the seat cushion 320 and the seat back 330 changes, thus causing variations or changes in the magnitudes of the loads of the seated person M on the seat cushion 320 and the seat back 330 and the directions in which the loads are applied to the seat cushion 320 and the seat back 330. Therefore, the position of the ischial contact point QC is determined as described below, in view of the deformations of the seat cushion 320 and the seat back 330.

As shown in FIG. 7, the reclining-position ischial contact point QB obtained when the position of the seat back 330 is changed to the reclining position 310B is determined without taking account of the deformations of the seat cushion 320 and the seat back 330. On the other hand, QC indicates the ischial contact point at which the tuber of ischium of the seated person M, who sinks more deeply into the seat cushion 320 and the seat back 330, contacts the seat cushion 320, depending on the shape of the hip of the seated person M, the magnitude of the load on the seat 310, and the direction of application of the load, after reclining of the seat back 330. Therefore, the L-shaped link 450 is shaped so that the position of the seat-cushion rear-end pivot point 404 when the vehicle seat 310 is in the reclining position 310B coincides with a position corresponding to the ischial contact point QC, whereby the amount of deformation can be taken into consideration.

As shown in FIG. 7, the L-shaped link 450 operates in the following manner when the positions of the seat cushion 320 and the seat back 330 are changed from those of the vehicle seat 310 in the normal position 310A to those of the vehicle seat 310 in the reclining position 310B, so that the seat-cushion rear-end pivot point 404 is corrected to the position corresponding to the ishcial contact point QC. As shown in FIG. 7, when the vehicle seat 310 is in the normal position 310A, the seat-cushion rear-end pivot point 404 as seen in the side view of the seat cushion 320 is located at the position designated by reference numeral 404C. This position 404C is displaced from the normal-position ischial contact point QA. If the position of the vehicle seat 310 is changed to the reclining position 310, the seated person M sinks more deeply into the seat and the tuber-of-ischium point of the seated person M is located at the position QC. At this time, the seat-cushion rear-end pivot point 404D lies at the same position as the ischial contact point QC. Thus, after reclining, the ischial contact point Q and the seat cushion 320 are not displaced with respect to each other, and the position of the seat back 330 is also changed with respect to the ischial contact point Q.

According to the modified example of the third embodiment, the position of the tuber-of-ischium point of the seated person M relative to the seat cushion 320 is corrected in view of the amounts of deformation of the seat cushion 320 and the seat back 330 due to the load applied from the seated person M, so that the "back displacement" and "hip displacement" of the seated person M can be eliminated with further reliability.

The vehicle seat of the invention is not limited to those of the illustrated embodiments, but various changes, additions and/or deletions may be made without changing the principle of the invention. While the link mechanism 90 is operated manually in the first through third embodiments, the invention is not limited to this arrangement. For example, the link mechanism 90 may be replaced by a link mechanism that is electrically operated.

While the link mechanism 90 is operated manually in the first through third embodiments, the invention is not limited to this arrangement. For example, the vehicle seat 10 may be brought into the normal position 10A or the reclining position 10B by means of a tilt mechanism for the seat back and a lifter mechanism for the seat cushion using electric actuators.

In the first through third embodiments, the angle of a seat surface of the seat cushion 20, 220, 320 when the vehicle seat is in the normal position 10A, 210A, 310A is equal to that of the seat cushion 20, 220, 320 when the vehicle seat is in the reclining position 10B, 210B, 310B. However, the invention is not limited to this arrangement. It may be found more desirable to lift a front end portion of the seat cushion 20, 220, 320 upward in the vertical direction of the vehicle when the vehicle seat 10, 210, 310 is placed in the reclining position 10B, 210B, 310B, to be higher than that of the seat cushion 20, 220, 320 when the vehicle seat 10, 210, 310 is in the normal position 10A, 210A, 310A. In this case, the angle of the seat surface may be easily changed by changing the length and inclination of the straight link 92 provided at the front of the seat cushion.

In the first embodiment through the third embodiment, one end of the straight link 92 serves as the lower-rail pivot point 94, and the straight link 92 is pivotably attached to each of the lower rails 86 joined to the seat-cushion mount floor 82 such that the link 92 can pivot about the pivot point 94. However, the invention is not limited to this arrangement. For example, the straight link 92 may be pivotably attached to a vehicle-body structure other than the lower rail 86.

In the first embodiment through the third embodiment, the vehicle seat 10, 210, 310 is provided as a rear seat in the second row or third row in the vehicle compartment, and a vehicle-body structure, such as a luggage compartment, is formed behind the vehicle seat. Thus, there is a limitation to the reclining motion of the seat back due to the layout of the vehicle compartment. However, the invention is not limited to the above arrangement. The vehicle seat of the invention may be employed as a driver's seat or passenger seat in the first row in the vehicle compartment. In this case, an attention needs to be paid when an engaging protrusion and an engaging slot are provided at a side portion of the seat back. In the first through third embodiment, one of the engaging protrusion and the engaging slot is formed on/in the vehicle-body structure. Thus, it should be noted that, when the vehicle seat of the invention is used as a driver's seat or passenger seat in the first row, a frame structure needs to be provided on/in which the engaging protrusion or the engaging slot is formed.

What is claimed is:

1. A vehicle seat comprising:
 a seat back that is placed in one of a first position and a second position relative to a mounting portion of a vehicle body on which the seat back is mounted;
 a seat cushion that is placed in one of a first position and a second position relative to a mounting portion of the vehicle body on which the seat cushion is mounted; and a linked position-changing unit that moves the seat back and the seat cushion in relation to each other, so as to change the seat back and the seat cushion between the first positions and the second positions, wherein the linked position-changing unit includes a multi-point pivot link coupling the seat back with the seat cushion and a straight link pivotally coupled to a front end of the seat cushion such that when the seat back and the seat cushion are moved between the first positions and the second positions, respectively, the straight link and the multi-point pivot link move in relation to one another, when the seat back is in the first position, the seat back is inclined forward in a frontward direction of the vehicle seat relative to the seat back when the seat back is in the second position, and when the seat back is in the second position, the seat back is reclined backwards in a rearward direction of the vehicle seat relative to the seat back when the seat back is in the first position, and the linked position-changing unit moves the seat back and the seat cushion in relation to each other, so that a back contact point of the seat back, at which a predetermined portion of a back of a seated person contacts the seat back when the seat back and the seat cushion are in the first positions, is located at substantially the same position as a predetermined portion of the back of the seated person when the seat back and the seat cushion are in the second positions and so that an ischial contact point of the seat cushion, at which a tuber of ischium of the seated person contacts the seat cushion when the seat back and the seat cushion are in the first positions, is located at substantially the same position as the tuber of ischium of the seated person when the seat back and the seat cushion are in the second positions.

2. The vehicle seat according to claim 1, wherein the distance between the back contact point and the ischial contact point when the seat back and the seat cushion are in the first positions is substantially equal to the distance between the back contact point and the ischial contact point when the seat back and the seat cushion are in the second positions.

3. The vehicle seat according to claim 1, wherein the seat cushion and the seat back pivot about a point in the vicinity of the ischial contact point when the vehicle seat is viewed in a side view.

4. The vehicle seat according to claim 1, wherein when the position of the seat back is changed between the first position and the second position while the seated person is seated in the vehicle seat, the position of the seat cushion is changed in connection with the change in the position of the seat back, such that substantially no change arises in a positional relationship of the tuber of ischium of the seated person relative to the seat cushion when the vehicle seat is viewed in a side view.

5. The vehicle seat according to claim 4, wherein the seat cushion pivots about a first point at which the seat cushion is coupled to the linked position-changing unit, the first point being located at the same position as the ischial contact point when the vehicle seat is viewed in the side view, and the seat back pivots about the first point via the linked position-changing unit.

6. The vehicle seat according to claim 1, wherein when the positions of the seat back and the seat cushion are changed from the first positions to the second positions, an upward change in the position of the seat cushion relative to the mounting portion of the vehicle body and a downward change in the position of the seat back relative to the mounting portion of the vehicle body are effected at the same time in relation to each other.

7. The vehicle seat according to claim 1, wherein the vehicle seat is configured to correct a displacement of the ischial contact point of the seat cushion due to a deformation of the seat cushion based on a load applied from the seated person when the vehicle seat is moved from the first position to the second position and from the second position back to the first position so as to maintain a positional relationship of the tuber of ischium of the seated person relative to the seat cushion.

8. The vehicle seat according to claim 1, wherein when the seat cushion and the seat back are in the first positions, the straight link is inclined in the rearward direction of the vehicle seat, and when the seat cushion and the seat back are in the second positions, the straight link is pivoted in the frontward direction of the vehicle seat.

9. The vehicle seat according to claim 1, wherein the multi-point pivot link is an L-shaped link.

10. The vehicle seat according to claim 9, wherein the L-shaped link has three pivot points.

11. The vehicle seat according to claim 1, wherein the multi-point pivot link is a three-point pivot link.

12. The vehicle seat according to claim 11, wherein the three-point pivot link is an L-shaped link.

* * * * *